US012711905B2

(12) United States Patent
Gai et al.

(10) Patent No.: US 12,711,905 B2
(45) Date of Patent: Aug. 18, 2026

(54) PIXEL CIRCUIT, DRIVING METHOD THEREOF, AND DISPLAY PANEL

(71) Applicants: VISIONOX TECHNOLOGY INC., Jiangsu (CN); Yungu (Gu'an) Technology Co., Ltd., Langfang (CN)

(72) Inventors: Cuili Gai, Jiangsu (CN); Deqiang Zhang, Jiangsu (CN); Xiujian Zhu, Jiangsu (CN); Xiaoyu Gao, Jiangsu (CN); Enqing Guo, Jiangsu (CN); Junfeng Li, Jiangsu (CN)

(73) Assignees: Visionox Technology Inc., Jiangsu (CN); Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 18/984,014

(22) Filed: Dec. 17, 2024

(65) Prior Publication Data

US 2025/0201179 A1 Jun. 19, 2025

(30) Foreign Application Priority Data

Dec. 18, 2023 (CN) ......................... 202311734981.8

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2310/061* (2013.01);
(Continued)

(58) Field of Classification Search
CPC .. G09G 3/32; G09G 3/3233; G09G 2310/061; G09G 2310/08;
(Continued)

(56) References Cited

U.S. PATENT DOCUMENTS 12,165,589 B2 * 12/2024 Guo ..................... G09G 3/3233
2022/0238065 A1 * 7/2022 Liu ..................... G09G 3/3233
(Continued)

FOREIGN PATENT DOCUMENTS

CN 109872680 A 6/2019
CN 111754919 A 10/2020
(Continued)

OTHER PUBLICATIONS

Chinese Office Action issued Jan. 25, 2024, in corresponding Chinese Application No. 202311734981.8, 13 pages.
(Continued)

*Primary Examiner* — Kenneth B Lee, Jr.
(74) *Attorney, Agent, or Firm* — Maier & Maier, PLLC

(57) ABSTRACT

A first data write module of a pixel circuit, in response to an effective potential of a first control signal, writes a global data voltage on a first global signal line to a gate node of a drive module in a write frame and at least one retention frame to increase the frequency of writing data or prolong the duration of writing data at the gate node of the drive module during a low-frequency image refresh. A second data write module of the pixel circuit, in response to an effective potential of a second control signal, writes a data control voltage on a data line to a control node in the write frame to enable the control node to have a control potential, and maintains the potential of the control node at the control potential in the retention frame.

20 Claims, 14 Drawing Sheets

(52) U.S. Cl.
CPC . *G09G 2310/08* (2013.01); *G09G 2320/0233* (2013.01); *G09G 2320/0247* (2013.01); *G09G 2330/021* (2013.01)

(58) Field of Classification Search
CPC ... G09G 2320/0233; G09G 2320/0247; G09G 2330/021
See application file for complete search history.

(56) References Cited

U.S. PATENT DOCUMENTS

| | | | | |
|---|---|---|---|---|
| 2023/0316987 A1* | 10/2023 | Zhai | G09G 3/2096 345/214 |
| 2024/0078948 A1* | 3/2024 | Zheng | G09G 3/3233 |
| 2025/0124861 A1* | 4/2025 | Gao | G09G 3/32 |

FOREIGN PATENT DOCUMENTS

| | | | |
|---|---|---|---|
| CN | 112382235 | A | 2/2021 |
| CN | 113838420 | A | 12/2021 |
| CN | 114299849 | A | 4/2022 |
| CN | 114333698 | A | 4/2022 |
| CN | 114792511 | A | 7/2022 |
| CN | 115831058 | A | 3/2023 |
| CN | 115909967 | A | 4/2023 |
| CN | 115938312 | A | 4/2023 |
| CN | 115997248 | A | 4/2023 |
| CN | 116682358 | A | 9/2023 |
| KR | 1020200101605 | A | 8/2020 |
| KR | 1020230017283 | A | 2/2023 |
| KR | 1020230109758 | A | 7/2023 |
| KR | 1020230133387 | A | 9/2023 |
| WO | 2023/019578 | A1 | 2/2023 |

OTHER PUBLICATIONS

Office Action issued on Jun. 19, 2025, in corresponding Korean Application No. 10-2024-0185704, 31 pages.

Office Action issued on Feb. 4, 2026, in corresponding Korean Application No. 10-2024-0185704, 8 pages.

* cited by examiner

PIXEL CIRCUIT, DRIVING METHOD THEREOF, AND DISPLAY PANEL

CROSS-REFERENCE TO RELATED APPLICATION(S)

This application claims priority to Chinese Patent Application No. 202311734981.8 filed Dec. 18, 2023, the disclosure of which is incorporated herein by reference in its entirety.

TECHNICAL FIELD

Embodiments of the present disclosure relate to the field of display technology and, in particular, to a pixel circuit, a driving method thereof, and a display panel.

BACKGROUND

With the development of display technology, requirements for the quality of the image display of a display panel become increasingly higher.

The display panel includes multiple pixel circuits, and the pixel circuit includes a drive transistor which can generate a drive current to drive a light-emitting element of the pixel circuit to emit light.

However, in the related art, the potential of the gate of the drive transistor cannot be maintained during the low-frequency image refresh, thereby resulting in a poor quality of the image display.

SUMMARY

The present disclosure provides a pixel circuit, a driving method thereof, and a display panel.

In a first aspect, the embodiments of the present disclosure provide a pixel circuit. The pixel circuit includes a drive module, a first light emission control module, a light-emitting module, a first data write module, and a second data write module.

The drive module, the first light emission control module, and the light-emitting module are sequentially connected in series. The drive module has a gate node, and the first light emission control module has a control node.

The first data write module is coupled between a first global signal line and the drive module and configured to, in response to an effective potential of a first control signal, write a global data voltage on the first global signal line to the gate node.

The second data write module is coupled between a data line and the control node and configured to, in response to an effective potential of a second control signal, write a data control voltage on the data line to the control node to enable the control node to have a control potential.

In a second aspect, the embodiments of the present disclosure further provide a driving method of a pixel circuit. The driving method is used for driving the pixel circuit described in the first aspect and includes the following steps.

A first data write module writes, in response to an effective potential of a first control signal, a global data voltage on a first global signal line to a gate node.

A second data write module writes, in response to an effective potential of a second control signal, a data control voltage on a data line to a control node to enable the control node to have a control potential.

In a third aspect, the embodiments of the present disclosure further provide a display panel. The display panel includes multiple pixel circuits described in the first aspect, multiple first global signal lines described in the first aspect, and multiple data lines described in the first aspect. The multiple pixel circuits are arranged in multiple columns. When one display cycle includes one write frame and multiple retention frames, the first data write modules in the pixel circuits of the same color are coupled to the same first global signal line, and the second data write modules in the pixel circuits in the same column are coupled to the same data line. Different first global signal lines are configured with global data voltages having different voltage values, different data lines are configured with corresponding data control voltages, and the data control voltage corresponds to the display image of the display panel.

In some embodiments, when one display cycle includes one write frame and multiple retention frames, the first data write modules in pixel circuits of the same color are coupled to the same first global signal line, and the second data write modules in pixel circuits in the same column are coupled to the same data line. Different first global signal lines are configured with global data voltages having different voltage values, different data lines are configured with corresponding data control voltages, and the data control voltage corresponds to the display image of the display panel.

In some embodiments, the display panel further includes a second global signal line. When one display cycle includes multiple write frames, the first data write modules in the pixel circuits in the same column are coupled to the same data line, and the second data write modules in the pixel circuits are coupled to the second global signal line. The second global signal line is configured with a global control voltage, different data lines are configured with corresponding grayscale data voltages, and a grayscale data voltage corresponds to a target grayscale of a pixel circuit coupled to a respective one of the data lines.

In some embodiments, the pixel circuit further includes a compensation module and a second light emission control module. The control terminal of the compensation module accesses a third control signal, and the control terminal of a first light emission control unit and the control terminal of a second light emission control unit of the second light emission control module access a light emission control signal. The gate driving circuit for generating a first control signal, the gate driving circuit for generating the third control signal, and the gate driving circuit for generating the light emission control signal share the same clock signal.

In some embodiments, the pixel circuit further includes a first reset module and a second reset module. The control terminal of the first reset module accesses a fourth control signal, and the control terminal of the second reset module accesses a fifth control signal. Optionally, the gate driving circuit for generating the first control signal, the gate driving circuit for generating the third control signal, the gate driving circuit for generating the fourth control signal, the gate driving circuit for generating the fifth control signal, and the gate driving circuit for generating the light emission control signal share the same clock signal.

In some embodiments, the gate driving circuit for generating the first control signal, the gate driving circuit for generating the third control signal, the gate driving circuit for generating the fourth control signal, and the gate driving circuit for generating the fifth control signal are the same gate driving circuit.

DETAILED DESCRIPTION

Figure 1:
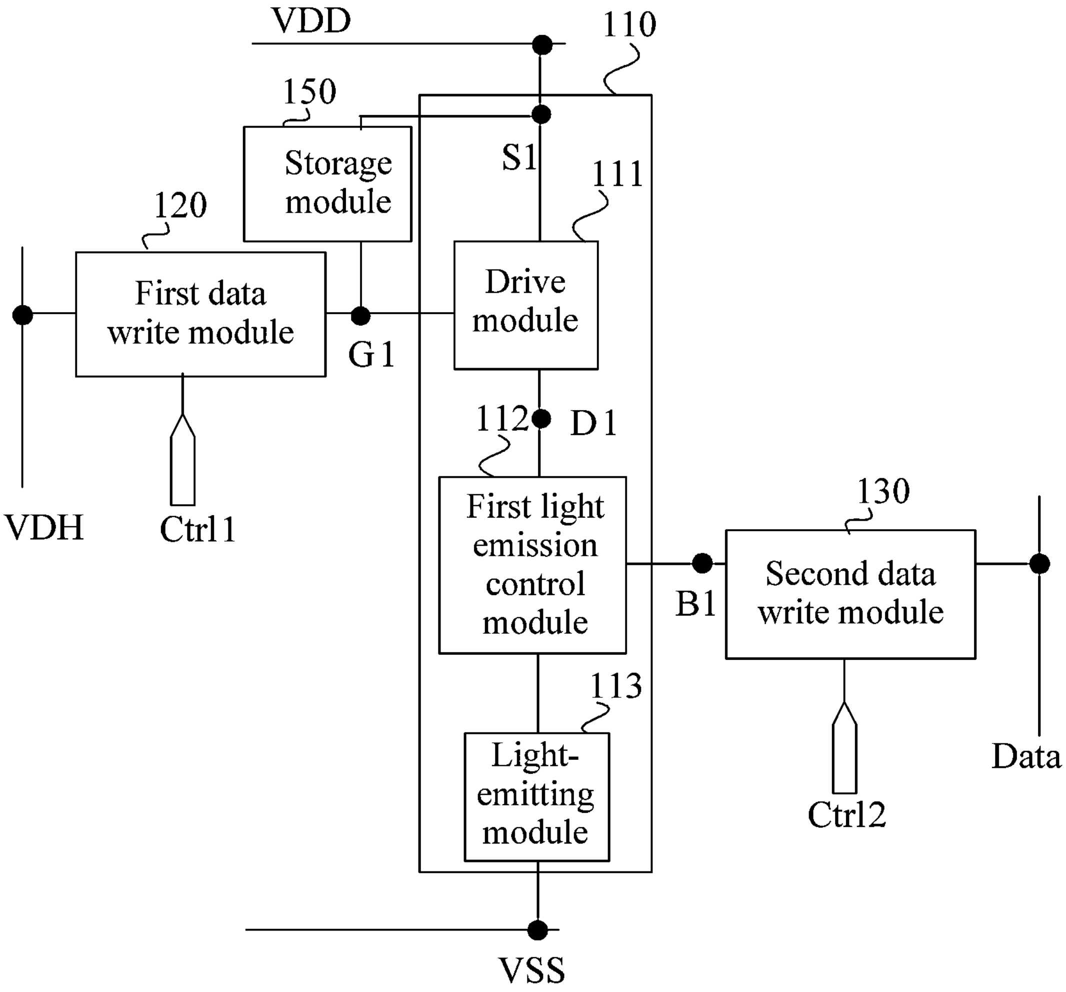
FIG. 1 is a structure diagram of a pixel circuit according to one or more embodiments of the present disclosure.

The present disclosure is further described in detail hereinafter in connection with drawings and embodiments. It is to be understood that the embodiments described herein are intended to illustrate and not to limit the present disclosure. Additionally, it is to be noted that to facilitate description, only part, not all, of structures related to the present disclosure are illustrated in the drawings.

In embodiments of the present disclosure, a module may be considered to be a part of a circuit or a sub-circuit of a circuit, which may be called a circuit or sub-circuit. For example, in a pixel circuit, a drive module, may be called a drive circuit or a drive sub-circuit; a first data write module, may be called a first data write circuit or a first data write sub-circuit; a second data write module, may be called a second data write circuit or a second data write sub-circuit.

As described in the Background, in the related art, the potential of the gate of the drive transistor cannot be maintained during the low-frequency image refresh, thereby resulting in a poor quality of the image display. The inventors have found that the reason for the above problem is as follows. The low-frequency image refresh involves a write frame and at least one retention frame, a grayscale data voltage is written to the gate of the drive transistor only in the write frame, and the potential of the gate of the drive transistor is maintained by a storage capacitor in the pixel circuit in the retention frame. Since the pixel circuit further includes a switch transistor connected to the gate of the drive transistor and the switch transistor has a certain leakage current, the potential of the gate of the drive transistor cannot be well maintained after the grayscale data voltage is written to the gate of the drive transistor in the write frame during the low-frequency image refresh. The drive current generated by the drive transistor is directly related to the magnitude of the voltage of the gate of the drive transistor, and if the voltage of the gate of the drive transistor cannot be well maintained, the magnitude of the drive current would change when the display panel displays the same display image. For example, in a write frame and a retention frame corresponding to a same display image, the drive current generated by the drive transistor in the write frame is different from the drive current generated by the drive transistor in the retention frame corresponding to the same display image, and/or, the drive currents generated by the drive transistor in different retention frames corresponding to the same display image are different. The brightness of the light-emitting device is related to the magnitude of the drive current flowing through the light-emitting device, and when the drive currents are different, the brightness of the light-emitting device becomes different, resulting in screen flicker in the low-frequency image refresh and a poor quality of the display image.

Figure 2:
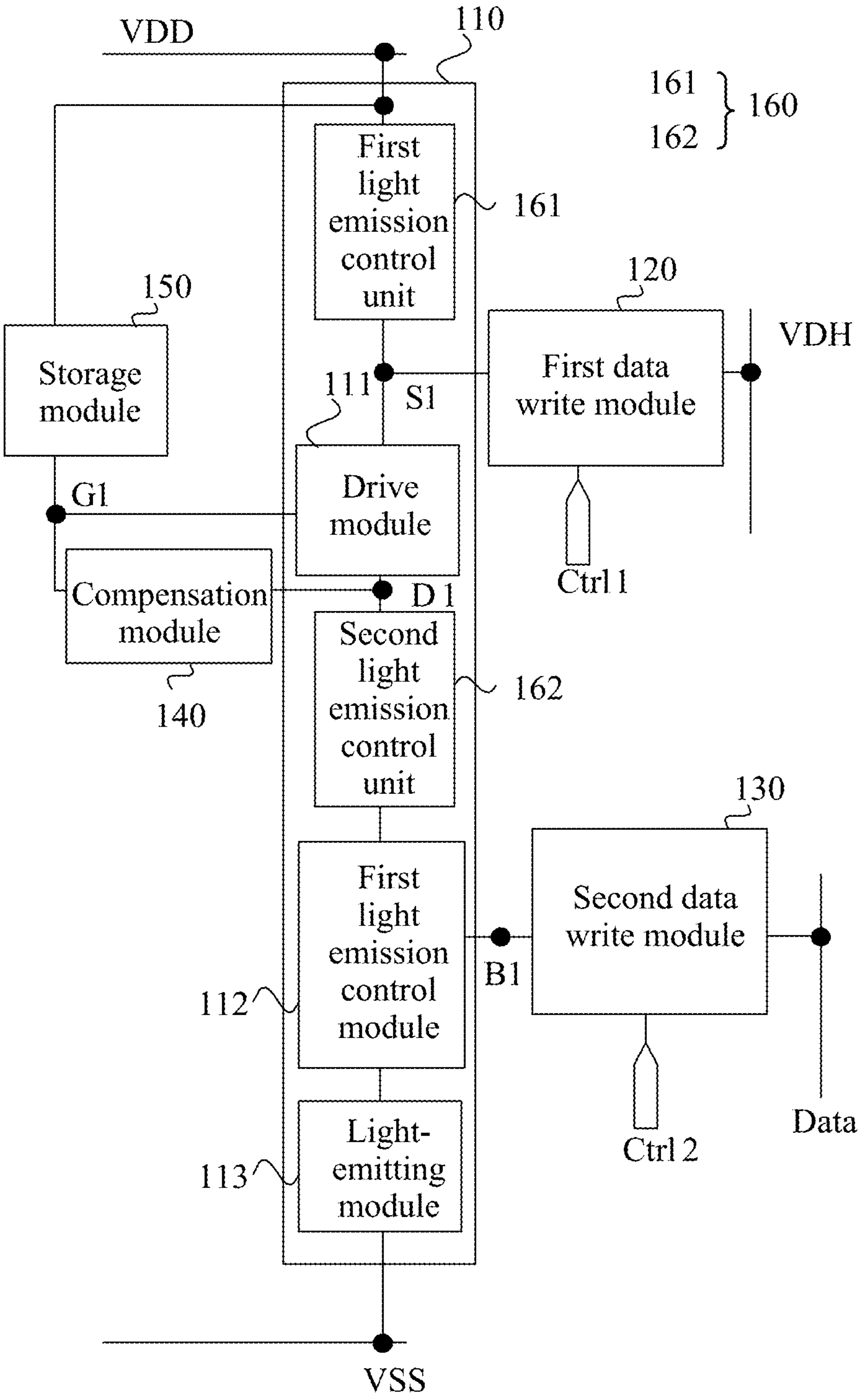
FIG. 2 is a structure diagram of another pixel circuit according to one or more embodiments of the present disclosure.

For the above reason, the embodiments of the present disclosure provide a pixel circuit, and the pixel circuit operates at different image refresh frequencies when the image refresh frequencies of the display panel are different. FIG. 1 is a structure diagram of a pixel circuit according to one or more embodiments of the present disclosure, and FIG. 2 is a structure diagram of another pixel circuit according to one or more embodiments of the present disclosure. With reference to FIGS. 1 and 2, the pixel circuit includes a drive module 111, a first light emission control module 112, and a light-emitting module 113, a first data write module 120 and a second data write module 130. The drive module 111, the first light emission control module 112, and the light-emitting module 113 are sequentially connected in series. The drive module 111 has a gate node G1, and the first light emission control module 112 has a control node B1.

The first data write module 120 is coupled between a first global signal line VDH and the drive module 111 and configured to, in response to an effective potential of a first control signal Ctrl1, write a global data voltage on the first global signal line VDH to the gate node G1.

The second data write module 130 is coupled between a data line Data and the control node B1 and configured to, in response to an effective potential of a second control signal Ctrl2, write a data control voltage on the data line Data to the control node B1 to enable the control node B1 to have a control potential. The first light emission control module 112 is controlled by the data control voltage to be turned on or turned off.

The drive module 111, the first light emission control module 112, and the light-emitting module 113 are connected in series between a first power voltage line VDD and a second power voltage line VSS. The light-emitting module 113 is illuminated when the drive module 111 and the first light emission control module 112 are turned on, and the light-emitting module 113 is not illuminated when the drive module 111 or the first light emission control module 112 is turned off. The light-emitting module 113 may include a light-emitting device D1. The light-emitting device D1 may be an organic light-emitting device (for example, an organic light-emitting diode (OLED)) or an inorganic light-emitting device (for example, a Micro-light-emitting diode (LED)), which is not specifically limited in the embodiments here.

The drive module 111 may include a drive transistor. The gate node G1 of the drive module 111 may be connected to the gate of the drive transistor, or the gate of the drive transistor may serve as the gate node G1 of the drive module 111. The drive module 111 further includes a source node S1 and a drain node D1, and the drive transistor further includes a source and a drain. The source of the drive transistor is connected to the source node S1 of the drive module 111 or the source of the drive transistor serves as the source node S1 of the drive module 111. The drain of the drive transistor is connected to the drain node D1 of the drive module 111 or the drain of the drive transistor serves as the drain node D1 of the drive module 111. The drive module 111 and the first light emission control module 112 are connected in series. The first light emission control module 112 may be connected at the source node S1 of the drive module 111 or the drain module 111 of the drive transistor.

In the pixel circuit, the driving method thereof, and the display panel provided in the embodiments here, a first data write module, in response to an effective potential of a first control signal, writes a global data voltage on a first global signal line to a gate node of a drive module to increase the frequency of writing data or prolong the duration of writing data at the gate node of the drive module during a low-frequency image refresh, thereby enabling the potential of the gate node of the drive module to change less, that is, the potential of the gate node of the drive module can be well maintained. A second data write module, in response to an effective potential of a second control signal, writes a data control voltage on a data line to a control node in a write frame to enable the control node to have a control potential and maintains the potential of the control node at the control potential in a retention frame so that the low-frequency image refresh is controlled by writing the data control voltage to a first light emission control module by the second data write module in the write frame. Therefore, the potential of the gate node of the drive module is enabled to change less while the low-frequency image refresh is achieved, that is, the potential of the gate node of the drive module is well maintained, so that the magnitude of the drive current generated by the drive module in the same display image changes less while the low-frequency image refresh is achieved, thereby ensuring that the brightness of the light-emitting module changes less, reducing screen flicker, and improving the display quality.

With reference to FIGS. 1 and 2, the pixel circuit further includes a first data write module 120. With reference to FIG. 1, in some optional embodiments of the present disclosure, the first data write module 120 is directly connected to the gate node G1 of the drive module 111. In other optional embodiments of the present invention, as shown in FIG. 2, the first data write module 120 may not be directly connected to the gate node G1 of the drive module 111 but is instead connected to the source node S1 or the drain node D1 of the drive module 111. As shown in FIG. 2, such pixel circuit further includes a compensation module 140. The compensation module 140 is configured to write a threshold voltage of the drive transistor in the drive module 111 to the gate node G1 in a threshold compensation stage.

The image display of the display panel may be divided into multiple display cycles. For example, the duration corresponding to one display cycle is one second. One display cycle includes at least one write frame. The second data write module 130 is configured to, in response to the effective potential of the second control signal Ctrl2, write the data control voltage on the data line Data to the control node B1 in the write frame to enable the control node B1 to have the control potential.

For example, one display cycle includes multiple write frames when the image refresh frequency is high. In some optional embodiments of the present disclosure, each frame included in one display cycle is a write frame when the image refresh frequency is high. For example, the duration of one display cycle is one second, and when the image refresh frequency is 90 Hz, all of the 90 frames included in one second are write frames. Optionally, one display cycle further includes at least one retention frame. In other optional embodiments of the present disclosure, when the image refresh frequency is high, one display cycle may include multiple write frames and may further include at least one retention frame, which is not specifically limited in the embodiments here. When the refresh frequency of the display image is low, one display cycle may include one write frame and multiple retention frames. For example, the duration of one display cycle is one second, and when the image refresh frequency is 90 Hz, one frame included in one second is a write frame, and the other 89 frames are retention frames. The second data write module 130 is further configured to maintain the potential of the control node B1 at the control potential in the retention frame.

In the embodiments here, the first data write module 120 is coupled between the first global signal line VDH and the drive module 111. The first global signal line VDH is configured to transmit a global data voltage, and the first data write module 120 writes, in response to the effective potential of the first control signal Ctrl1, the global data voltage to the gate node G1 of the drive module 111 in the write frame and at least one retention frame. The global data voltage remains unchanged in the write frame and the retention frame of a single image refresh. The pixel circuit may further include a storage module 150. The storage module 150 is connected to the gate node G1 and configured to store and retain the potential of the gate node G1. Different from the case in the related art where each pixel circuit corresponds to one grayscale data voltage, in the embodiments here, the global data voltages may correspond to multiple pixel circuits in the display panel. In some optional embodiments of the present disclosure, the pixel circuits of the same color correspond to the same global data voltage, where the pixel circuits of the same color mean that the color of the light emitted by the light-emitting modules 113 in the pixel circuits is the same. The global data voltage is configured to be a voltage at which the drive module 111 drives the light-emitting module 113 to emit light according to a drive current generated from the global data voltage when a drive branch 110 is turned on.

In addition, unlike the related art, in the embodiments here, when one display cycle includes a write frame and a retention frame, the first data write module 120 writes data (that is, the global data voltage) to the gate node G1 of the drive module 111 not only in the write frame but also in at least one retention frame to increase the frequency of writing data or prolong the duration of writing data at the gate node G1 of the drive module 111 during the low-frequency image refresh, thereby enabling the change of the potential of the gate node G1 of the drive module 111 to be relatively small, that is, the potential of the gate node G1 of the drive module 111 can be well maintained.

The pixel circuit further includes the second data write module 130. The second data write module 130 is coupled between the data line Data and the control node B1. The second data write module 130 writes, in response to the effective potential of the second control signal Ctrl2, the data control voltage on the data line Data to the control node B1 in the write frame to enable the control node B1 to have the control potential. When the display cycle includes a retention frame, the second data write module 130 maintains the potential of the control node B1 at the control potential in the retention frame. The first light emission control module 112 is controlled by the data control voltage to be turned on or turned off. The data control voltage may be a voltage that enables the first light emission control module 112 to be turned on and a voltage that enables the first light emission control module 112 to be turned off. If the second data write module 130 writes the voltage that enables the first light emission control module 112 to be turned on to the control node B1 in the write frame, the first light emission control module 112 is turned on in the write frame. Moreover, since in the retention frame, the second data write module 130 can maintain the control potential which is written to the control node B1 in the write frame, the first light emission control module 112 is also turned on in the retention frame. On the contrary, if the second data write module 130 writes the voltage that enables the first light emission control module 112 to be turned off to the control node B1 in the write frame, the first light emission control module 112 is turned off in the write frame. Moreover, since in the retention frame, the second data write module 130 can maintain the control potential which is written to the control node B1 in the retention frame, the first light emission control module 112 is also turned off in the retention frame. That is, in one display cycle, the conduction state of the first light emission control module 112 in the pixel circuit remains unchanged, the light emission state of the light-emitting module 113 in the pixel circuit remains unchanged, and accordingly, the display image does not change. When the first light emission control module 112 is turned on and the drive module 111 and other components having switch functions between the first power voltage line VDD and the second power voltage line VSS are also turned on, the drive branch 110 is turned on; and when the first light emission control module 112 is turned off, the drive branch 110 is turned off.

For example, the data control voltage corresponds to the display image of the display panel. If the display image of one set of write frames and retention frames (denoted as a first set of write frames and retention frames) is different from the display image of the next set of write frames and retention frames (denoted as a second set of write frames and retention frames), that is, the display image needs to change, the conduction state of the first light emission control module 112 in the pixel circuit corresponding to each sub-pixel of a pixel may change in the second set of write frames and retention frames relative to the first set of write frames and retention frames. For example, when a turn-on control potential is written to the control node B1 of the pixel circuit corresponding to each sub-pixel of a pixel in the first set of write frames and retention frames, the first light emission control module 112 in the pixel circuit corresponding to each sub-pixel of the pixel is turned on, and when a turn-off control potential is written to the control node B1 of the pixel circuit corresponding to each sub-pixel of the pixel in the second set of write frames and retention frames, the first light emission control module 112 in the pixel circuit corresponding to each sub-pixel of the pixel is turned off.

Therefore, in the case where the first data write module 120 writes, in response to the effective potential of the first control signal Ctrl1, the global data voltage to the gate node G1 of the drive module 111 in the write frame and at least one retention frame, by writing the data control voltage to the first light emission control module 112 by the second data write module 130 in the write frame, the change of the potential of the gate node G1 of the drive module 111 is enabled to be relatively small while the light-emitting module 113 is controlled to perform the low-frequency image refresh, that is, the potential of the gate node G1 of the drive module 111 is well maintained, so that the magnitude of the drive current generated by the drive module 111 in the same display image changes less during the low-frequency image refresh, thereby ensuring that the brightness of the light-emitting module 113 changes less, reducing screen flicker, and improving the display quality.

In the pixel circuit provided in the embodiments, the first data write module, in response to the effective potential of the first control signal, writes a global data voltage on the first global signal line to the gate node of the drive module to increase the frequency of writing data or prolong the duration of writing data at the gate node of the drive module during a low-frequency image refresh, thereby enabling the potential of the gate node of the drive module to change less, that is, the potential of the gate node of the drive module can be well maintained. The second data write module, in response to the effective potential of the second control signal, writes a data control voltage on the data line to the control node in the write frame to enable the control node to have a control potential and maintains the potential of the control node at the control potential in the retention frame so that the low-frequency image refresh is controlled by writing the data control voltage to the first light emission control module by the second data write module in the write frame. Therefore, the potential of the gate node of the drive module is enabled to change less while the low-frequency image refresh is achieved, that is, the potential of the gate node of the drive module is well maintained, so that the magnitude of the drive current generated by the drive module in the same display image changes less while the low-frequency image refresh is achieved, thereby ensuring that the brightness of the light-emitting module changes less, reducing screen flicker, and improving the display quality.

Figure 3:
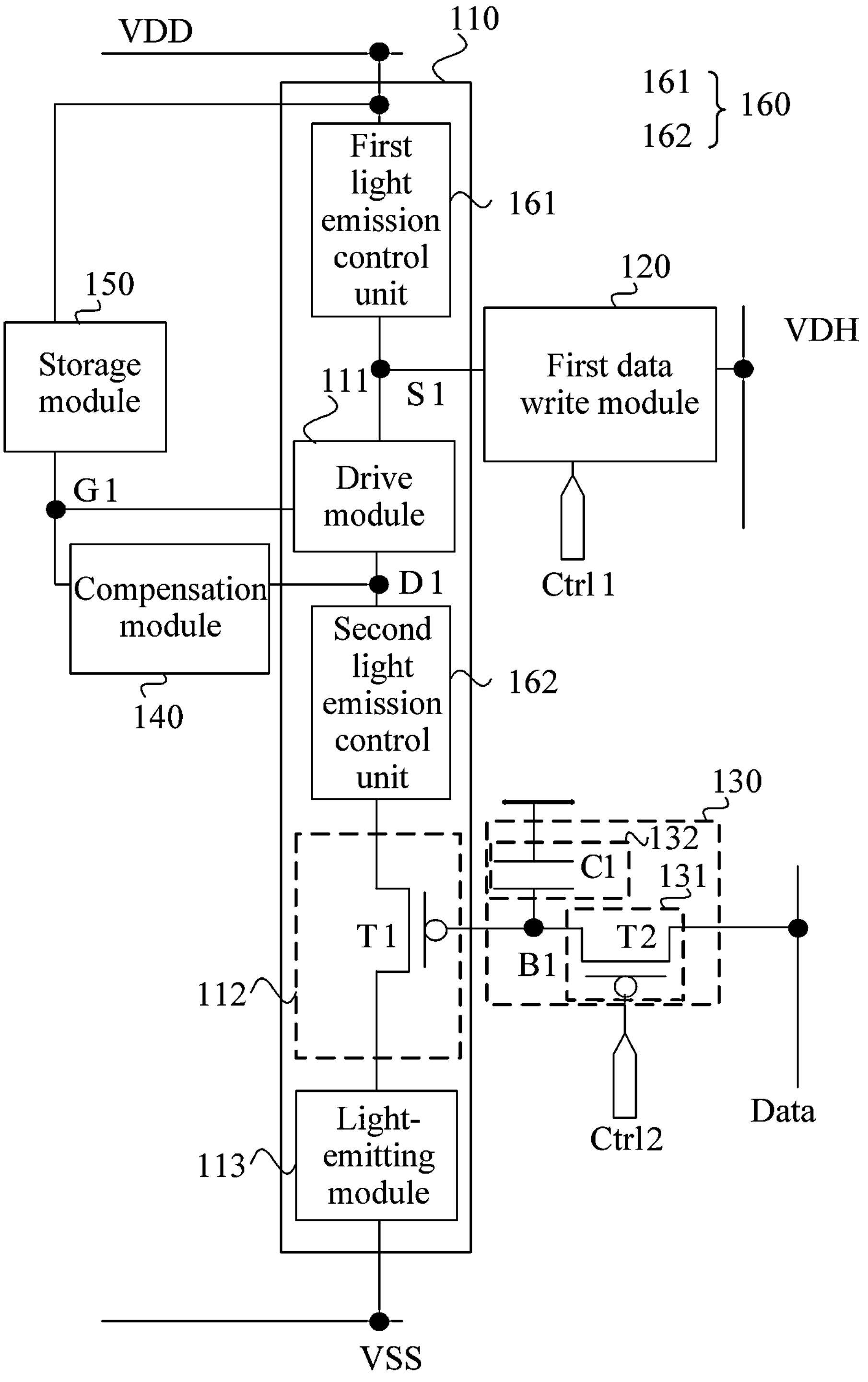
FIG. 3 is a structure diagram of another pixel circuit according to one or more embodiments of the present disclosure.

FIG. 3 is a structure diagram of another pixel circuit according to one or more embodiments of the present disclosure. FIGS. 1 to 3 correspond to the connection between the pixel circuit and the signal lines in the display panel during the low-frequency image refresh. With reference to FIG. 3, on the basis of the above embodiments, optionally, the first light emission control module 112 includes a first light emission control transistor T1. The gate of the first light emission control transistor T1 is electrically connected to the control node B1. The data control voltage is configured to enable the first light emission control transistor T1 to operate in a linear region when the data control voltage controls the first light emission control transistor T1 to be turned on.

Specifically, the first light emission control transistor T1 is a switch transistor, and when the first light emission control transistor T1 operates in the linear region, slight changes in the potential of the gate of the first light emission control transistor T1 do not affect the current flowing through the first light emission control transistor T1. By setting the data control voltage to enable the first light emission control transistor T1 to operate in the linear region when the data control voltage controls the first light emission control transistor T1 to be turned on, during the low-frequency image refresh, even if the second data write module 130 cannot maintain the potential of the control node B1 in the retention frame very well and the potential of the control node B1 changes slightly, the current flowing through the first light emission control transistor T1 can still be consistent with the current in the write frame, thereby still reducing flicker during the low-frequency image refresh.

With continued reference to FIG. 3, optionally, the second data write module 130 includes a write unit 131 and a storage unit 132. The write unit 131 and the storage unit 132 are electrically connected to the control node B1, separately. The write unit 131 is configured to, in response to the effective potential of the second control signal Ctrl2, write the data control voltage on the data line Data to the control node B1 in the write frame to enable the control node B1 to have the control potential. The storage unit 132 is configured to maintain the potential of the control node B1 at the control potential in the retention frame.

The write unit 131 may include a first write transistor T2. The gate of the first write transistor T2 accesses the second control signal Ctrl2, a first electrode of the first write transistor T2 is connected to the data line Data, and a second electrode of the first write transistor T2 is connected to the control node B1. The first electrode of the first write transistor T2 is one of the source or the drain, and the second electrode of the first write transistor T2 is the other one of the source or the drain. When the second control signal Ctrl2 is at an effective potential, the write unit 131 is turned on to write the data control voltage to the control node B1. The storage unit 132 may include a first storage capacitor C1. One terminal of the storage unit 132 may access a fixed voltage, and the other terminal of the storage unit 132 may be connected to the control node B1. In some optional embodiments of the present disclosure, the fixed voltage accessed by the one terminal of the storage unit 132 may reuse the signal line connected to the pixel circuit for transmitting the fixed voltage, for example, the first power voltage line VDD or the second power voltage line VSS.

It is to be noted that the structure of the first light emission control module 112 in the pixel circuit shown in FIG. 1 may be the same as the structure of the first light emission control module 112 in the pixel circuit shown in FIG. 3, and the structure of the second data write module 130 in the pixel circuit shown in FIG. 1 may be the same as the structure of the second data write module 130 in the pixel circuit shown in FIG. 3.

In some optional embodiments of the present disclosure, when the display cycle includes one write frame and multiple retention frames, the effective potential of the first control signal Ctrl1 is configured to be generated in the write frame and at least one retention frame.

When the effective potential of the first control signal Ctrl1 is configured to be generated in the write frame and at least one retention frame, the first data write module 120 is coupled to the source node S1 of the drive module 111, which is shown in the pixel circuit in FIGS. 2 and 3.

Specifically, when the display cycle includes one write frame and multiple retention frames and the effective potential of the first control signal Ctrl1 is configured to be generated in the write frame and at least one retention frame, the first control signal Ctrl1 is configured to have an effective potential pulse in the write frame and have an effective potential pulse in at least one retention frame. Optionally, when the display cycle includes one write frame and multiple retention frames, the effective potential of the first control signal Ctrl1 is configured to be generated in the write frame and each retention frame, that is, one effective potential pulse of the first control signal Ctrl1 exists in the write frame and each retention frame. By setting the frequency of the effective potential in the first control signal Ctrl1 in this manner, compared to the related art, the frequency at which the first data write module 120 writes data to the gate node G1 during the low-frequency image refresh can be increased so that the time interval between two times of writing data to the gate node G1 is shortened, thereby ensuring that the change in the potential of the gate node G1 during the low-frequency display is reduced and improving the display quality.

In other optional embodiments of the present disclosure, when the display cycle includes one write frame and multiple retention frames, the first control signal Ctrl1 is configured to be maintained at the effective potential in at least one retention frame. Specifically, when the first control signal Ctrl1 is configured to be maintained at the effective potential in at least one retention frame, the first data write module 120 is coupled to the gate node G1, which is shown in the pixel circuit in FIG. 1.

By setting the first control signal Ctrl1 to be configured to be maintained at the effective potential in at least one retention frame when the display cycle includes one write frame and multiple retention frames, in one aspect, the global data voltage can be continuously written to the gate node G1 in the retention frame in which the first control signal Ctrl1 is maintained at the effective level to prolong the duration of writing the global data voltage to the gate node G1, thereby reducing the change in the potential of the gate node G1; in another aspect, the jump frequency of the first control signal Ctrl1 can be reduced, thereby helping reduce power consumption.

Figure 4:
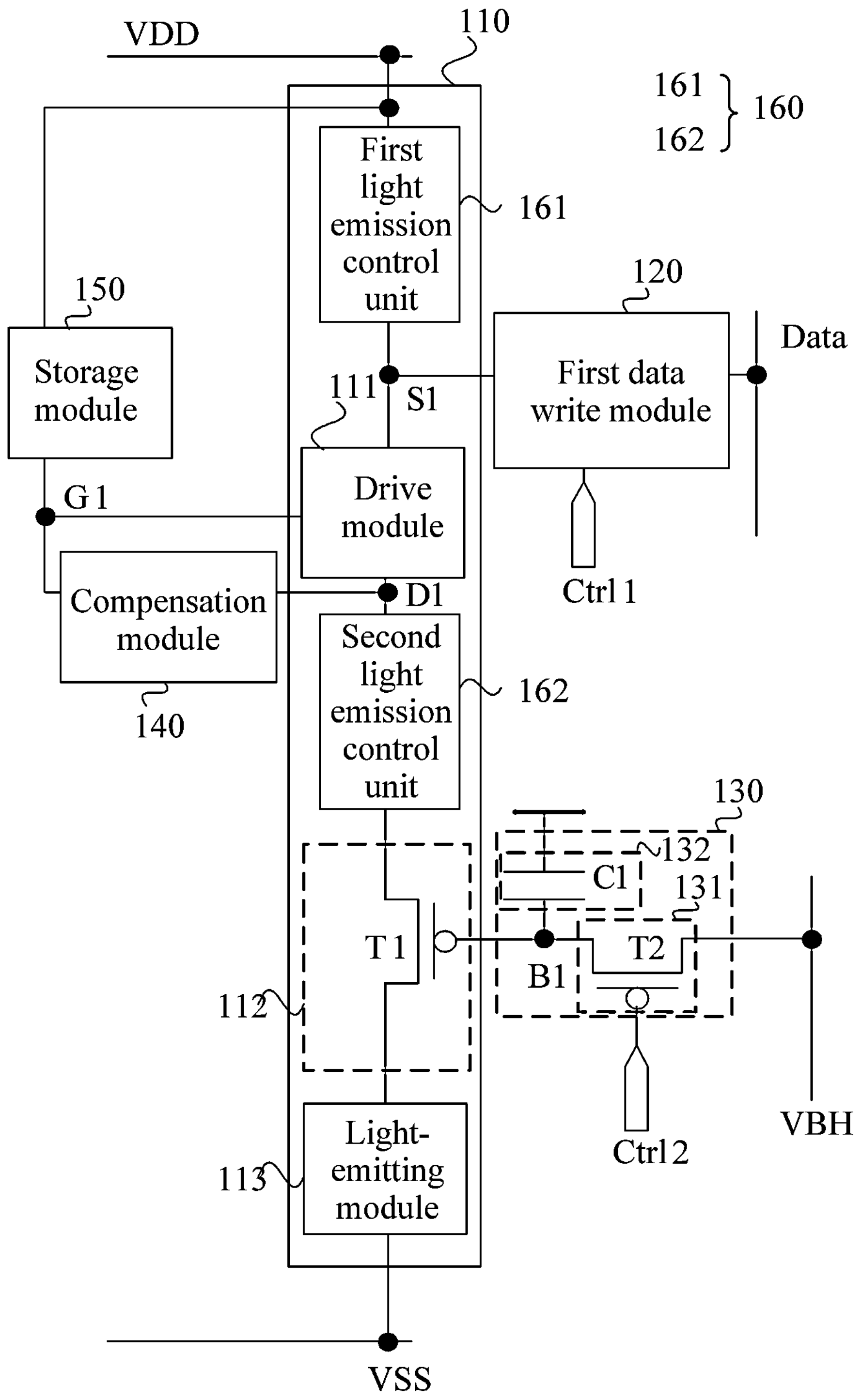
FIG. 4 is a structure diagram of another pixel circuit according to one or more embodiments of the present disclosure.

FIG. 4 is a structure diagram of another pixel circuit according to one or more embodiments of the present disclosure. The pixel circuit shown in FIG. 4 corresponds to the connection between the pixel circuit and the signal lines in the display panel during the high-frequency image refresh. Although the structure of the pixel circuit in FIG. 4 is the same as the structure of the pixel circuit in FIGS. 2 and 3, the connection between the pixel circuit and the signal lines in the display panel at different image refresh frequencies is different. With reference to FIG. 4, on the basis of the above solutions, in some optional embodiments of the present disclosure, when one display cycle includes multiple write frames, the first data write module 120 is configured to be coupled between the data line Data and the drive module 111 and, in response to the effective potential of the first control signal Ctrl1, write a grayscale data voltage on the data line Data to the gate node G1; the second data write module 130 is configured to be coupled between a second global signal line VBH and the control node B1 and, in response to the effective potential of the second control signal Ctrl2, write a global control voltage on the second global signal line VBH to the control node B1 to enable the control node B1 to have the control potential.

When one display cycle includes multiple write frames, the first data write module 120 writes, in response to the effective potential of the first control signal Ctrl1, the grayscale data voltage on the data line Data to the gate node G1. The grayscale data voltage differs from the global data voltage in that the grayscale data voltages may be in one-to-one correspondence with the pixel circuits, the grayscale data voltages corresponding to different pixel circuits may be different, and the grayscale data voltages corresponding to two pixel circuits of the same color may be different.

On the basis of the above solutions, for the pixel circuit shown in FIG. 4, optionally, a grayscale data voltage corresponds to a display grayscale, and the voltage values of the grayscale data voltages corresponding to different display grayscales of a same display brightness level are different.

Specifically, the display device such as a mobile phone, a computer, and the like generally includes a brightness adjustment button by which a user adjusts the overall display brightness of the display device, and each touch-press action on the brightness adjustment button may correspond to one inputted display brightness level. Each display brightness level may correspond to one display brightness of the maximum grayscale in the display panel, and when the display brightness corresponding to the maximum grayscale in the display panel changes, the display brightness corresponding to other grayscales also changes. Specifically, when the display brightness corresponding to the maximum grayscale in the display panel is increased, the display brightness corresponding to other grayscales is also increased; when the display brightness corresponding to the maximum grayscale in the display panel is decreased, the display brightness corresponding to other grayscales is also decreased. During the high-frequency image refresh, the pixel circuit of the embodiments here is compatible with the display of the display image having different display grayscales of the pixel circuit during the high-frequency image refresh in the related art.

During the high-frequency image refresh, the second data write module 130 writes, in response to the effective potential of the second control signal Ctrl2, the global control voltage on the second global signal line VBH to the control node B1. The difference between the global control voltage and the data control voltage lies in that the data control voltages are in one-to-one correspondence with the pixel circuits, and the data control voltages corresponding to different pixel circuits may be different; while the global control voltage corresponds to all the pixel circuits, and the global control voltage corresponding to each pixel circuit is the same. Optionally, the data control voltage has a first potential and a second potential, and the global control voltage has a third potential. The first potential and the third potential are configured to enable the first light emission control module 112 to be turned on, and the second potential is configured to enable the first light emission control module 112 to be turned off. In some optional embodiments of the present disclosure, the third potential is equal to the first potential. Accordingly, during the low-frequency image refresh, in the write frame, the data control voltages written to the control nodes B1 of part of the pixel circuits in the display panel have the first potential, and the corresponding first light emission control modules 112 are turned on; the data control voltages written to the control nodes B1 of part of the pixel circuits have the second potential, and the corresponding first light emission control modules 112 are turned off. During the high-frequency image refresh, in the write frame, the global control voltage is written to the control nodes B1 of all the pixel circuits in the display panel, and the global control voltage has the third potential so that the first light emission control modules 112 in all the pixel circuits are turned on; the image refresh frequency in such a case is equal to the frequency at which the first data write module 120 writes the grayscale data voltage.

For the pixel circuit shown in FIG. 4, optionally, when the display cycle includes one write frame and multiple retention frames, a global data voltage corresponds to a display brightness level, the voltage values of the global data voltage corresponding to a same display brightness level are the same, and the voltage values of the global data voltages corresponding to different display brightness levels are different.

For example, the global data voltage may be a grayscale data voltage corresponding to a set grayscale at a corresponding display brightness level, and the set grayscale, for example, may be the maximum display grayscale. Specifically, by setting the global data voltage to correspond to the display brightness level during the low-frequency image refresh, the brightness of the corresponding display image at different display brightness levels can be different.

With continued reference to FIGS. 1 to 3, in other optional embodiments of the present disclosure, FIGS. 1 to 3 also correspond to the connection between the pixel circuit and the signal lines in the display panel during the low-frequency image refresh. When one display cycle includes multiple write frames, the first data write module 12 is configured to be coupled between the first global signal line VDH and the drive module 111 and, in response to the effective potential of the first control signal Ctrl1, write the global data voltage to the gate node G1; the second data write module 130 is configured to be coupled between the data line Data and the control node B1 and, in response to the effective potential of the second control signal Ctrl2, write the data control voltage to the control node B1 to enable the control node B1 to have the control potential. In the embodiments, during both low-frequency image refresh and high-frequency image refresh, the first data write module 120 is configured to be coupled between the first global signal line VDH and the drive module 111, and the second data write module 130 is configured to be coupled between the data line Data and the control node B1. Therefore, during both low-frequency image refresh and high-frequency image refresh, the connection configuration of the first data write module 120 is the same, the connection configuration of the second data write module 120 is also the same, and thus, the structure for switching the connection of the first data write module 120 and the structure for switching the connection of the second data write module 130 do not need to be set in the display panel when the image refresh frequency is switched, thereby simplifying the structure of the display panel and making the method of driving the pixel circuit simple and easy to implement.

On the basis of the above solutions, when the display cycle includes multiple write frames and in the case where the first data write module 120 is configured to be coupled between the first global signal line VDH and the drive module 111 and the second data write module 130 is configured to be coupled between the data line Data and the control node B1, optionally, during both low-frequency image refresh and high-frequency image refresh, the global data voltage corresponds to the display brightness level, the voltage values of the global data voltage are the same when the corresponding display brightness levels are the same, and the voltage values of the global data voltages are different when the corresponding display brightness levels are different. That is, regardless of whether during the high-frequency image refresh or low-frequency image refresh, in the embodiments here, the global data voltage corresponds to the display brightness level, and accordingly, the display brightness of the image is determined by the display brightness level. At the same display brightness level, the light-emitting module 113 has either a bright state or a dark state. For example, when the global data voltage is equal to the grayscale data voltage corresponding to the set grayscale at a corresponding display brightness level, in the embodiments here, the light-emitting module 113 at each display brightness level only has the brightness corresponding to the set grayscale (bright state) and the brightness corresponding to the grayscale of 0 (dark state). In this case, when the pixels include red sub-pixels, green sub-pixels, and blue sub-pixels, the display panel may display eight colors, including red (only the red sub-pixels are illuminated), green (only the green sub-pixels are illuminated), blue (only the blue sub-pixels are illuminated), white (the red sub-pixels, the green sub-pixels, and the blue sub-pixels are illuminated), yellow (only the red sub-pixels and the green sub-pixels are illuminated), purple (only the red sub-pixels and the blue sub-pixels are illuminated), cyan (only the green sub-pixels and the blue sub-pixels are illuminated), black (the red sub-pixels, the green sub-pixels and the blue sub-pixels are not illuminated).

On the basis of the above solutions, when one display cycle includes multiple write frames and in the case where the first data write module 120 is configured to be coupled between the first global signal line VDH and the drive module 111, and the second data write module 130 is configured to be coupled between the data line Data and the control node B1, optionally, during both low-frequency image refresh and high-frequency image refresh, the data control voltage has a first potential and a second potential, where the first potential is configured to enable the first light emission control module 112 to be turned on, and the second potential is configured to enable the first light emission control module 112 to be turned off.

Specifically, during both low-frequency image refresh and high-frequency image refresh, the voltage which the first data write module 120 writes to the gate node G1 is the global data voltage, and the image refresh frequency may be controlled by the data control voltage which the second data write module 130 writes to the first light emission control module 112. When the data control voltage is a voltage having the first potential, the first light emission control module 112 in the pixel circuit is turned on during the image refresh; when the data control voltage is a voltage having the second potential, the first light emission control module 112 in the pixel circuit is turned off during the image refresh.

On the basis of the above solutions, optionally, when one display cycle includes multiple write frames, the effective potential of the first control signal Ctrl1 is configured to be generated in each write frame, thereby refreshing the image at a high frequency. When one display cycle includes multiple write frames, the effective potential of the second control signal Ctrl2 is configured to be generated at each write frame to ensure that the global control voltage is written to the control node B1 once per frame, and thus, the first light emission control module 112 is in a good on state in each frame.

Figure 5:
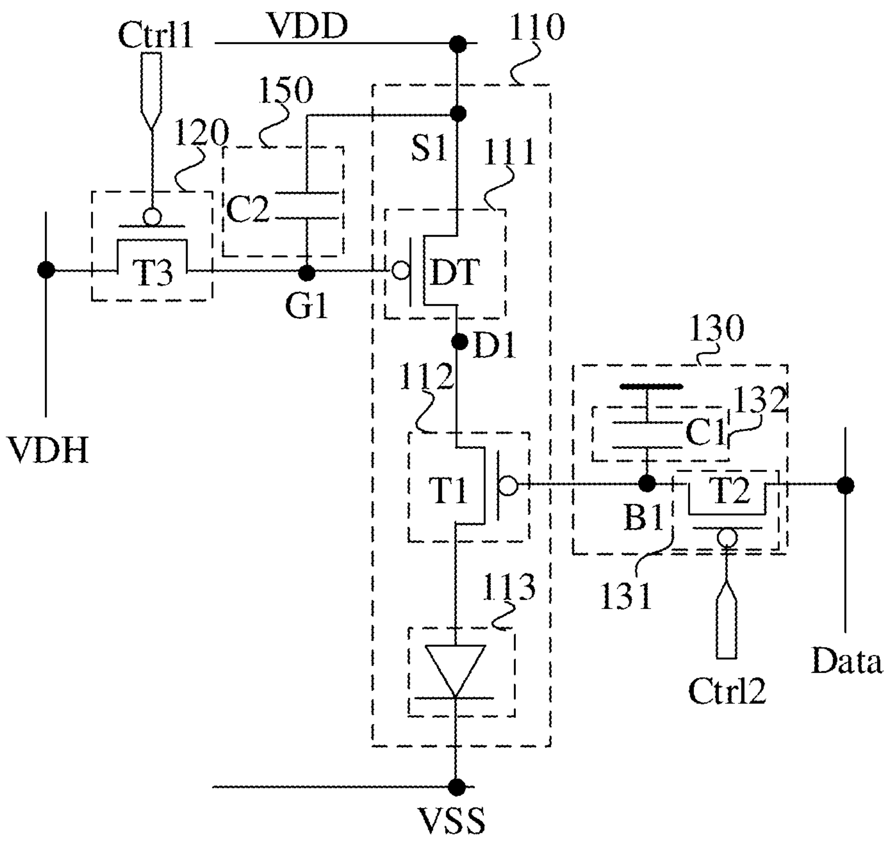
FIG. 5 is a structure diagram of another pixel circuit according to one or more embodiments of the present disclosure.
Figure 6:
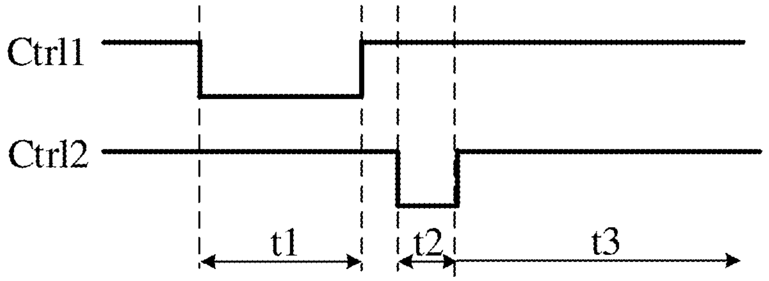
FIG. 6 is a drive timing diagram of the pixel circuit shown in FIG. 5 in a write frame during high-frequency image refresh and low-frequency image refresh.
Figure 7:
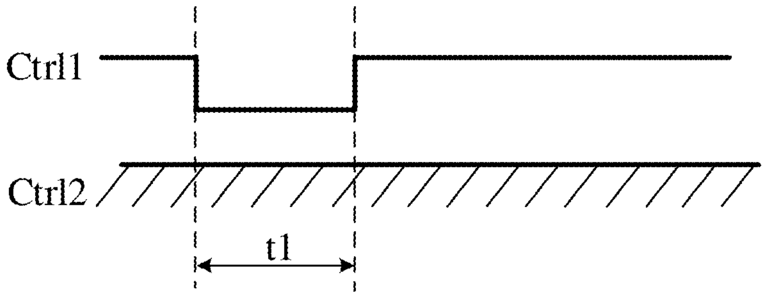
FIG. 7 is a drive timing diagram of the pixel circuit shown in FIG. 5 in a retention frame during the low-frequency image refresh.
Figure 8:
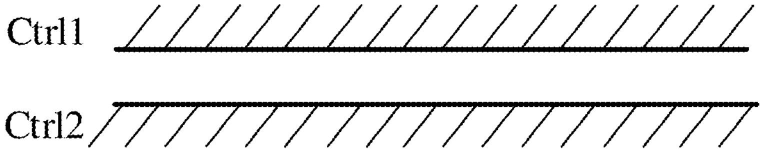
FIG. 8 is another drive timing diagram of the pixel circuit shown in FIG. 5 in a retention frame during the low-frequency image refresh.

The working process of the pixel circuit in the above embodiments of the present disclosure will be described below. FIG. 5 is a structure diagram of another pixel circuit according to an embodiment of the present disclosure. The pixel circuit here may correspond to the specific circuit structure of the pixel circuit shown in FIG. 1. With reference to FIG. 5, the drive module 111 includes a drive transistor DT, the first light emission control module 112 includes a first light emission control transistor T1, the write unit 131 of the second data write module 130 includes a first write transistor T2, the storage unit 132 of the second data write module 130 includes a first storage capacitor C1, the first data write module 120 includes a second write transistor T3, and the storage module 150 includes a second storage capacitor C2. The transistors in the pixel circuit may be P-type transistors or may be N-type transistors. FIG. 5 is illustrated with all the transistors as P-type transistors. FIG. 6 is a drive timing diagram of the pixel circuit shown in FIG. 5 in a write frame during high-frequency image refresh and low-frequency image refresh, FIG. 7 is a drive timing diagram of the pixel circuit shown in FIG. 5 in a retention frame during the low-frequency image refresh, and FIG. 8 is another drive timing diagram of the pixel circuit shown in FIG. 5 in a retention frame during the low-frequency image refresh.

With reference to FIGS. 5 and 6, in the write frame during the high-frequency image refresh and low-frequency image refresh, the working process of the pixel circuit may include a data write stage t1, a control potential write stage t2, and a light emission stage t3.

In the data write stage t1, the first control signal Ctrl1 is at a low potential (at an effective potential), and the second write transistor T3 is turned on to write the global data voltage on the first global signal line VDH to the gate node G1.

In the control potential write stage t2, the second control signal Ctrl2 is at a low potential (at an effective potential), and the first write transistor T2 is turned on to write the data control voltage on the data line Data to the control node B1. If the data control voltage is at a first potential, the first light emission control transistor T1 is turned on; if the data control voltage is at a second potential, the first light emission control transistor T1 is turned off.

In the light emission stage t3, if the data control voltage is at a first potential, the drive transistor DT generates a drive current according to the global data voltage, and the drive current is transmitted to the light-emitting module 113 through the turned-on first light emission control transistor T1 to drive the light-emitting module 113 to emit light; if the data control voltage is at a second potential, the first light emission control transistor T1 is turned off, the drive branch 110 is turned off, and the light-emitting module 113 does not emit light.

With reference to FIGS. 5 and 7, in the retention frame during the low-frequency image refresh, the working process of the pixel circuit may include a data write stage t1 and a light emission stage t3. The working process of the data write stage t1 in the retention frame is the same as the process of the data write stage t1 in the write frame, and the details are not repeated here. In the drive timing of the retention frame shown in FIG. 7, the timing corresponding to the first control signal Ctrl1 is the same as that in the write frame, that is, the first control signal Ctrl1 has one effective potential pulse in both the retention frame and the write frame. The timing shown in FIG. 7 may correspond to the case where the effective potential of the first control signal Ctrl1 is configured to be generated at a frequency higher than a low-frequency in the low-frequency image refresh. In this manner, the frequency at which the global data voltage is written to the gate node G1 is increased, and the gate potential of the gate node G1 changes less. In the retention frame, the light emission stage t3 may correspond to the duration of the entire retention frame, that is, the entire retention frame is the light emission stage t3. In the retention frame, the second control signal Ctrl2 is always at an ineffective potential, and the storage unit 132 stores the control potential at the control node B1 written in the control potential write stage t2 of the write frame, so that the light emission state of the light-emitting module 113 in the retention frame is the same as that in the write frame.

With reference to FIGS. 5 and 8, in another optional drive timing of the retention frame during the low-frequency frame refresh, the first control signal Ctrl1 is always at an effective potential, and the second control signal Ctrl2 is always at an ineffective potential. Accordingly, throughout the retention frame, the first data write module 120 (the second write transistor T3) remains on to continuously write the global data voltage to the gate node G1 such that the duration in which the global voltage is written to the gate node G1 is prolonged, thereby enabling the gate node G1 to be well maintained at the global data voltage in the retention frame. The write unit 131 (the first write transistor T2) remains off, and the storage unit 132 maintains the control potential at the control node B1 written in the write frame.

With continued reference to FIGS. 2 to 4, optionally, the pixel circuit further includes a compensation module 140 and a second light emission control module 160. When one display cycle includes multiple write frames, the compensation module 140 is configured to write a threshold voltage of the drive transistor DT in the drive module 111 to the gate node G1 in the threshold compensation stage; the second data write module 130 is configured to write the data control voltage to the control node B1 in the control potential write stage to enable the control node B1 to have the control potential; the second light emission control module 160 is configured to control the drive branch 110 to be turned off in the threshold compensation stage and the control potential write stage and to control the drive branch 110 to be turned on in the light emission stage.

Specifically, the compensation module 140 is connected between the gate node G1 and the drain node D1 of the drive module 111. The compensation module 140 writes the threshold voltage of the drive transistor DT to the gate node G1 in the threshold compensation stages of the write frame and the retention frame during the low-frequency image refresh and the threshold compensation stage of the write frame during the high-frequency image refresh to compensate for the threshold voltage of the drive transistor DT, thereby eliminating display non-uniformity caused by inconsistency in the threshold voltages of the drive transistors DT in different pixel circuits in the display panel.

In the control potential write stage in the write frame during the low-frequency image refresh, the second control signal Ctrl2 is an effective potential signal, and the second data write module 130 writes the data control voltage on the data line Data to the control node B1; except for the control potential write stage of the write frame, the second control signal Ctrl2 is an ineffective potential, and the second data write module 130 maintains the control potential of the control node B1 after the control potential write stage of the write frame.

The pixel circuit further includes the second light emission control module 160, and the second light emission control module 160 may be included in the drive branch 110. The second light emission control module 160 is turned off in the threshold compensation stage and the control potential write stage to control the drive branch 110 to be turned off. In the light emission stage, the second light emission control module 160 is turned on, and in the case where the first light emission control module 112 is also turned on, the second light emission control module 160 and the first light emission control module 112 together control the drive branch 110 to be turned on.

Figure 9:
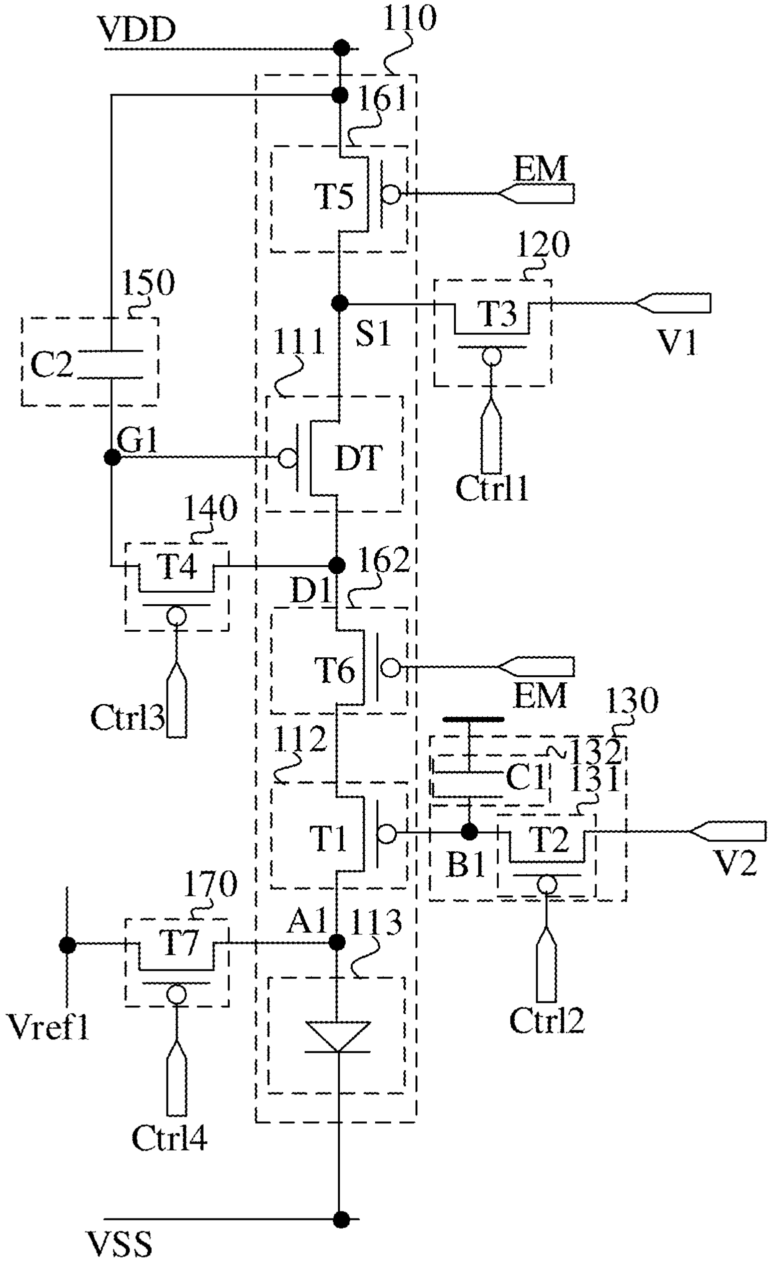
FIG. 9 is a structure diagram of another pixel circuit according to one or more embodiment of the present disclosure.

FIG. 9 is a structure diagram of another pixel circuit according to one or more embodiments of the present disclosure. The pixel circuit here may correspond to the specific circuit structures of the pixel circuits shown in FIGS. 2 to 4. With reference to FIG. 9, as in FIG. 5, the drive branch 110 is coupled between the first power voltage line VDD and the second power voltage line VSS, the drive module 111 includes a drive transistor DT, the first light emission control module 112 includes a first light emission control transistor T1, the write unit 131 of the second data write module 130 includes a first write transistor T2, the storage unit 132 of the second data write module 130 includes a first storage capacitor C1, and the first data write module 120 includes a second write transistor T3. Different from FIG. 5, the pixel circuit further includes a compensation module 140 and a second light emission control module 160. The compensation module 140 is coupled between the gate node G1 and the drain node D1, and the compensation module 140 includes a compensation transistor T4. The second light emission control module 160 includes a first light emission control unit 161 and a second light emission control unit 162. The first light emission control unit 161 is coupled between the first power voltage line VDD and the source node S1. The second light emission control unit 162 is coupled between the drain node D1 and the light-emitting module 113. The light-emitting module 113 is coupled between the second light emission control unit 162 and the second power voltage line VSS. The first light emission control unit 161 includes a second light emission control transistor T5. The second light emission control unit 162 includes a third light emission control transistor T6. The light-emitting module 113 includes a light-emitting device D1. The control terminal of the first light emission control unit 161 and the control terminal of the second light emission control unit 162 both access a light emission control signal EM.

For ease of the description of different situations of the pixel circuit shown in FIG. 9 during the low-frequency image refresh and high-frequency image refresh shown in FIGS. 2 and 3 and during the high-frequency image refresh shown in FIG. 4, in the pixel circuit shown in FIG. 9, the signal line connected to the first data write module 120 and the signal line connected to the second data write module 130 are not shown, but only a first voltage input terminal V1 connected to the first data write module 120 and a second voltage input terminal V2 connected to the second data write module 130 are shown. During the low-frequency image refresh, the first voltage input terminal V1 is configured to be connected to the first global signal line VDH, and the second voltage input terminal V2 is configured to be connected to the data line Data (corresponding the cases shown in FIGS. 2 and 3). In some optional embodiments, during the high-frequency image refresh, the first voltage input terminal V1 is configured to be connected to the first global signal line VDH, and the second voltage input terminal V2 is configured to be connected to the data line Data (corresponding the cases shown in FIGS. 2 and 3). In other optional embodiments, during the high-frequency image refresh, the first voltage input terminal V1 is configured to be connected to the data line Data, and the second voltage input terminal V2 is configured to be connected to the second global signal line VBH (corresponding the case shown in FIG. 4).

With continued reference to FIG. 9, optionally, the first light emission control module 112 is coupled between the second light emission control unit 162 and the light-emitting module 113. Specifically, the first light emission control module 112 is coupled between the second light emission control unit 162 and the anode of the light-emitting device and thus controls the conduction state of the drive branch 110.

It is to be noted that the first light emission control module 112 is set at any position in the drive branch 110 as long as the first light emission control module 112 can control the conduction state of the drive branch 110 and does not affect the writing of corresponding data by the first data write module 120 to the gate node G1. In other optional embodiments of the present disclosure, the first light emission control module 112 is coupled between the first power voltage line VDD and the first light emission control unit 161; or the first light emission control module 112 is coupled between the first light emission control unit 161 and the source node S1; or the first light emission control module 112 is coupled between the drain node D1 and the second light emission control unit 162.

Figure 10:
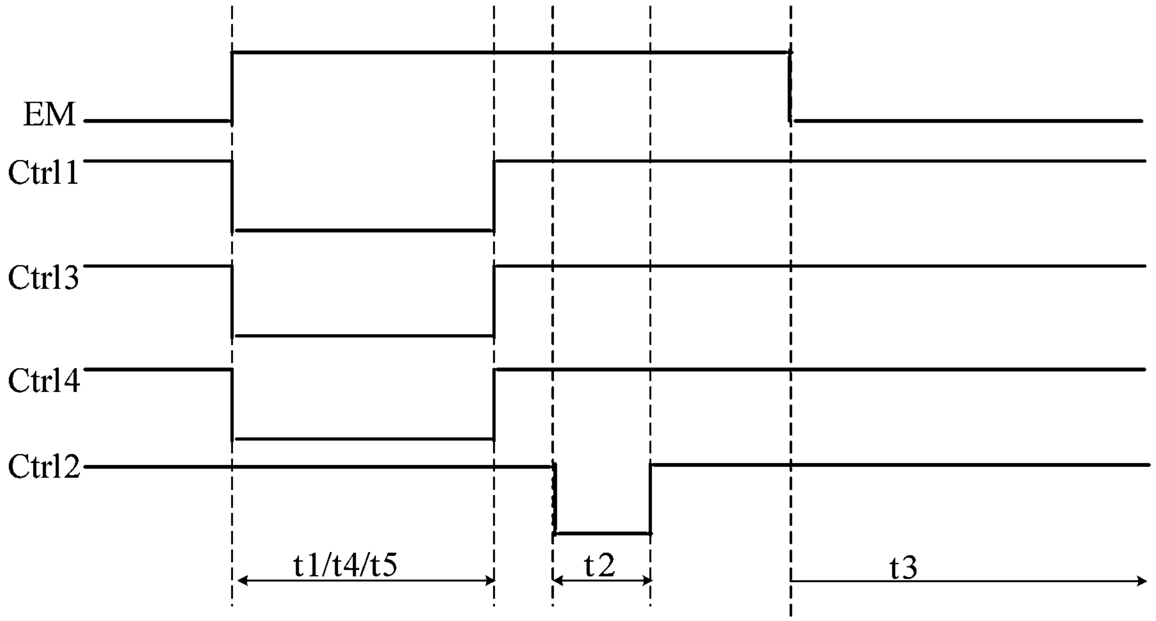
FIG. 10 is a drive timing diagram of the pixel circuit shown in FIG. 9 in a write frame during high-frequency image refresh and low-frequency image refresh.
Figure 11:
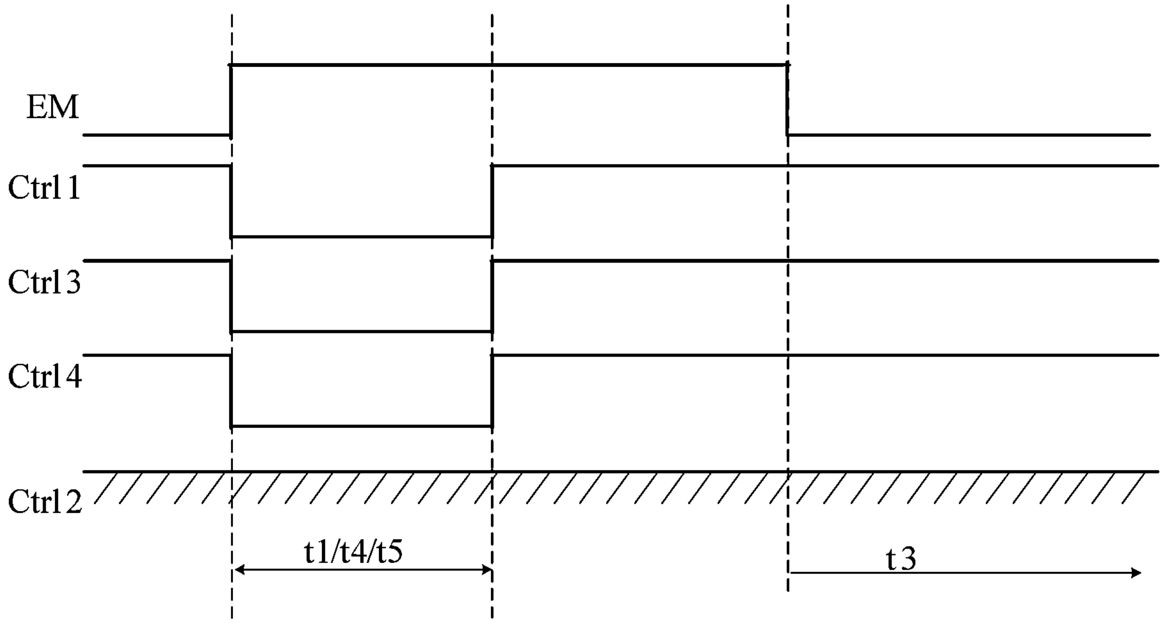
FIG. 11 is a drive timing diagram of the pixel circuit shown in FIG. 9 in a retention frame during the low-frequency image refresh.

All the transistors in the pixel circuit may be P-type transistors or may be N-type transistors. FIG. 5 is illustrated with all the transistors as P-type transistors. The gate of the compensation transistor T4 is configured to access a third control signal Ctrl3, and the compensation transistor T4 is turned on when the third control signal Ctrl3 is at an effective potential. FIG. 10 is a drive timing diagram of the pixel circuit shown in FIG. 9 in a write frame during high-frequency image refresh and low-frequency image refresh, and FIG. 11 is a drive timing diagram of the pixel circuit shown in FIG. 9 in a retention frame during the low-frequency image refresh. The drive timing shown in FIGS. 10 and 11 may correspond to the case where the first voltage input terminal V1 is configured to be connected to the first global signal line VDH and the second voltage input terminal V2 is configured to be connected to the data line Data during the high-frequency image refresh and low-frequency image refresh (that is, the connection between the pixel circuit and the signal line during the high-frequency image refresh and low-frequency image refresh is as shown in FIGS. 2 and 3).

In conjunction with FIGS. 2 and 3 and with reference to FIGS. 9 and 10, in the write frame during the low-frequency image refresh and the write frame during the high-frequency image refresh, the working process of the pixel circuit may include a data write stage t1, a threshold compensation stage t4, a control potential write stage t2, and a light emission stage t3. The first data write module 120 is configured to write the global data voltage to the gate node G1 in the data write stage t1 during the high-frequency image refresh and low-frequency image refresh. In some optional embodiments of the present disclosure, the threshold compensation stage t4 also includes the data write stage t1, that is, the first control signal Ctrl1 may be reused as the third control signal Ctrl3. Accordingly, the third control signal Ctrl3 and the first control signal Ctrl1 may be provided by the same signal line, and the compensation transistor T4 (the compensation module 140) and the second write transistor T3 (the first data write module 120) may be connected to the same signal line, thereby reducing the number of signal lines connected to the pixel circuit, saving layout space, and simplifying the wiring structure of the display panel.

Optionally, the compensation module 140 is configured to, in response to an effective potential of the third control signal Ctrl3, write the threshold voltage of the drive transistor DT in the drive module to the gate node G1 in the threshold compensation stage.

Optionally, the second light emission control module 160 is configured to, in response to an effective potential of the light emission control signal EM, control the drive branch 110 to be turned off in the threshold compensation stage and the control potential write stage and configured to, in response to an ineffective potential of the light emission control signal EM, control the drive branch 110 to be turned on in the light emission stage.

When the image refresh frequency is a high frequency or a low frequency, for example, the low frequency is a first frequency, the high frequency is a second frequency, and the frequencies of the first control signal Ctrl1, the third control signal Ctrl3, and the light-emitting control signal EM are all the second frequency, that is, all three control signals have the same frequency. Therefore, optionally, the gate driving circuit for generating the first control signal Ctrl1, the gate driving circuit for generating the third control signal Ctrl3, and the gate driving circuit for generating the light emission control signal EM share the same clock signal, thereby reducing the number of signal lines in the bezel region of the display panel and helping to achieve the narrow bezel design.

In some optional embodiments of the present disclosure, the threshold compensation stage t4 also includes the control potential write stage t2, that is, the second control signal Ctrl2 may be reused as the third control signal Ctrl3. Accordingly, the third control signal Ctrl3 and the second control signal Ctrl2 may be provided by the same signal line, and the compensation transistor T4 (the compensation module 140) and the first write transistor T2 (the write unit 131) may be connected to the same signal line, thereby reducing the number of signal lines connected to the pixel circuit, saving layout space, and simplifying the wiring structure of the display panel. The threshold compensation stage t4 also includes the data write stage t1, which is illustrated in FIGS. 10 and 11.

In the data write stage t1 (the threshold compensation stage t4), the first control signal Ctrl1 is an effective potential signal, and the first data write module 120 (the second write transistor T3) is turned on to write the global data voltage to the gate node G1; at the same time, the third control signal Ctrl3 is an effective potential signal, and the compensation module 140 (the compensation transistor T4) is turned on to write the threshold voltage of the drive transistor DT to the gate node G1.

In the control potential write stage t2, the second control signal Ctrl2 is an effective potential signal, and the write unit 131 (the first write transistor T2) is turned on to write the data control voltage to the control node B1 to enable the control node B1 to have the control potential.

In the light emission stage t3, the light emission control signal EM is an effective potential signal, and the first light emission control unit 161 (the second light emission control transistor T5) and the second light emission control unit 162 (the third light emission control transistor T6) are turned on. If the control potential written to the control node B1 is a first potential in the control potential write stage t2, in the light emission stage t3, the first light emission control module 112 (the first light emission control transistor T1) is turned on, the drive current generated by the drive module 111 according to the global data voltage is transmitted to the light-emitting module 113, and the light-emitting module 113 is illuminated. If the control potential written to the control node B1 is at a second potential in the control potential write stage t2, in the light emission stage t3, the first light emission control module 112 (the first light emission control transistor T1) is turned off, the drive current generated by the drive module 111 according to the global data voltage is transmitted to the light-emitting module 113, and the light-emitting module 113 is not illuminated.

With continued reference to FIG. 10, optionally, the threshold compensation stage t4 does not overlap the control potential write stage t2, and accordingly, the effective potential pulse of the third control signal Ctrl3 does not overlap the effective potential pulse of the second control signal Ctrl2, thereby ensuring that the threshold compensation of the drive transistor DT and the writing of the control potential to the control node B1 do not affect each other. The threshold compensation stage t4 precedes the control potential write stage t2, which is illustrated in the drive timing in FIG. 10.

With continued reference to FIG. 10, optionally, an interval exists between the control potential write stage t2 and the light emission stage t3. Specifically, the light emission control signals EM of the first light emission control unit 161 and the second light emission control unit 162 in the pixel circuit are transmitted by a light emission control signal line, and accordingly, the gate of the first light emission control transistor T1 and the gate of the second light emission control transistor T5 are connected to the light emission control signal line. Each light emission control signal line is connected to at least one row of pixel circuits. Optionally, each light emission control signal line is connected to at least two rows of pixel circuits, and in this case, the interval duration between the control potential write stage t2 and the light emission stage t3 is greater than or equal to the sum of the duration of the effective potential pulse of the first control signal Ctrl1 and the duration of the effective potential pulse of the second control signal Ctrl2. By setting an interval between the control potential write stage t2 and the light emission stage t3, in the pixel circuits connected to the light emission control signal line, the first data write module 120 can fully write data to the gate node G1, and the second data write module 130 can fully write the control potential to the control node B1, thereby ensuring a good display effect.

In conjunction with FIGS. 2 and 3 and with reference to FIGS. 9 and 11, in the retention frame during the low-frequency image refresh, the working process of the pixel circuit includes a data write stage t1, a threshold compensation stage t4, and a light emission stage t3. During the low-frequency image refresh and high-frequency image refresh, the data line Data may maintain a fixed voltage in the retention frame when the first voltage input terminal V1 is configured to be connected to the first global signal line VDH and the second voltage input terminal V2 is configured to be connected to the data line Data.

The working processes of the data write stage t1 (the threshold compensation stage t4) and the light emission stage t3 in the retention frame are the same as the working processes of the data write stage t1 (the threshold compensation stage t4) and the light emission stage t3 in the write frame, respectively, and the details are not repeated here.

The difference of the working process of the retention frame from that of the write frame is that the working process of the pixel circuit in the retention frame does not include the control potential write stage t2, that is, the second control signal Ctrl2 is maintained at an ineffective potential in the retention frame, and the control potential of the control node B1 is stored and retained by the first storage unit 132 (the first storage capacitor C1) in the retention frame.

In the embodiments here, the effective potential of the first control signal Ctrl1 is generated in each write frame and at least one retention frame, and the effective potential of the second control signal Ctrl2 is generated in the write frame to ensure that the display image can be controlled to be refreshed at a low frequency through the effective potential of the second control signal Ctrl2 generated at a low frequency while the global data voltage is written to the gate node G1 at a high frequency, thereby effectively retaining the potential of the gate node G1 during the low-frequency display. Since the voltage written to the gate node G1 in each frame is the global data voltage, the writing of the global data voltage causes almost no power consumption, thereby ensuring low power consumption of the pixel circuit while the global data voltage is written to the gate node G1 at a high frequency.

With continued reference to FIGS. 9 to 11, the light-emitting module 113 has an anode node A1. Optionally, the pixel circuit further includes a first reset module 170. The first reset module 170 is coupled between a first reset signal line Vref1 and the anode node A1. The first reset module 170 is configured to write a first reset voltage on the first reset signal line Vref1 to the anode node A1 in a first reset stage. Optionally, the first reset module 170 includes a first reset transistor T7, and the gate of the first reset transistor T7 accesses a fourth control signal Ctrl4. Optionally, the first reset module 170 is configured to, in response to an effective potential of the fourth control signal Ctrl4, write the first reset voltage on the first reset signal line Vref1 to the anode node in the first reset stage. The first reset stage precedes the light emission stage t3 in both the write frame and the retention frame so that the anode node A1 is reset before the light emission stage t3, thereby avoiding the influence of the residual charge of the anode node A1 in the previous frame on the display in the current frame.

During the high-frequency image refresh and low-frequency image refresh, the frequencies of the first control signal Ctrl1, the third control signal Ctrl3, the fourth control signal Ctrl4, the fifth control signal Ctrl5, and the light emission control signal EM are all equal and high, that is, all five control signals are at the same frequency. Optionally, the gate driving circuit for generating the first control signal Ctrl1, the gate driving circuit for generating the third control signal Ctrl3, the gate driving circuit for generating the fourth control signal Ctrl4, the gate driving circuit for generating the fifth control signal Ctrl5, and the gate driving circuit for generating the light emission control signal EM share the same clock signal, thereby reducing the number of signal lines in the bezel region of the display panel and helping to achieve the narrow bezel design.

Optionally, the gate driving circuit for generating the first control signal Ctrl1, the gate driving circuit for generating the third control signal Ctrl3, the gate driving circuit for generating the fourth control signal Ctrl4, and the gate driving circuit for generating the fifth control signal Ctrl5 are the same gate driving circuit, thereby reducing the number of gate driving circuits in the bezel region of the display panel and further reducing the bezel size.

Optionally, the threshold compensation stage t4 further includes the first reset stage t5, and accordingly, the third control signal Ctrl3 is reused as the fourth control signal Ctrl4, that is, the gate of the compensation transistor T4 and the gate of the first reset transistor T7 can access the same control signal, thereby reducing the number of signal lines connected to the pixel circuit, saving layout space, and simplifying the wiring structure of the display panel.

Figure 12:
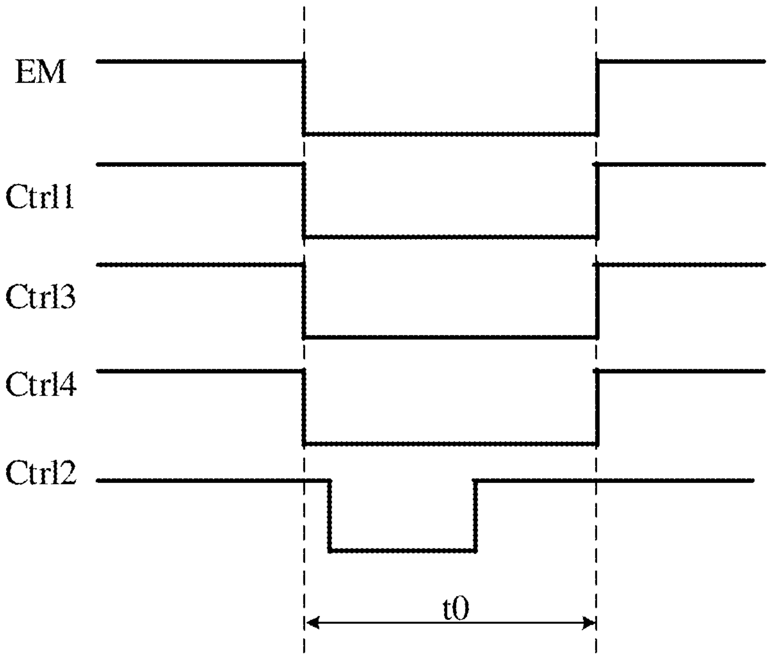
FIG. 12 is a drive timing diagram of a power-on reset stage according to one or more embodiments of the present disclosure.

During the high-frequency image refresh, the first voltage input terminal V1 is configured to be connected to the first global signal line VDH, and the second voltage input terminal V2 is configured to be connected to the data line Data (corresponding the cases shown in FIGS. 2 and 3 during the high-frequency image refresh). Optionally, the working process of the pixel circuit further includes a power-on reset stage, and the power-on reset stage precedes the write frame of the first display cycle. FIG. 12 is a drive timing diagram of a power-on reset stage according to one or more embodiments of the present disclosure. With reference to FIGS. 9 and 12, the image refresh further includes a power-on reset stage t0. The power-on reset stage to precedes the write frame. In the power-on reset stage t0, the compensation module 140 and the second light emission control module 160 are configured to be turned on, the first data write module 120 is configured to write the global data voltage and the threshold voltage to the gate node G1 through the drive module 111 and the compensation module 140, and the second data write module 130 is configured to enable the first light emission control module 112 on. Specifically, in the power-on reset stage t0, the first control signal Ctrl1, the second control signal Ctrl2, the third control signal Ctrl3, the fourth control signal Ctrl4, and the light emission control signal EM are all an effective potential signal to enable the first data write module 120, the compensation module 140, the second data write module 130, the second light emission control module 160, and the first reset module 170 to be turned on. Since all of the transistors in the pixel circuit except for the drive transistor DT are switch transistors and the channel length of the drive transistor DT is longer than the channel length of the switch transistor, the equivalent resistance of the drive transistor DT is the largest, so the potential Vg of the gate node G1 of the drive transistor DT is less than Vs+Vth, where Vs denotes the potential of the source node S1 of the drive transistor DT, and Vth denotes the threshold voltage of the drive transistor DT. Since the first data write module 120 (the second write transistor T3) is turned on and the potential Vs of the source node S1 is approximately equal to the global data voltage Vdh1, in the power-on reset stage t0, Vg<Vdh1+Vth, thereby ensuring that, when the first data write module 120 writes the global data voltage Vdh1 to the gate node G1 in the write frame of the data write stage t1, the drive transistor DT can be turned on in the subsequent image refresh.

The drive timing shown in FIGS. 10 and 11 may also correspond to the case where the first voltage input terminal V1 is configured to be connected to the first global signal line VDH and the second voltage input terminal V2 is configured to be connected to the data line Data during the low-frequency image refresh; and the first voltage input terminal V1 is configured to be connected to the data line Data and the second voltage input terminal V2 is configured to be connected to the second global signal line VBH during the high-frequency image refresh (that is, the connection between the pixel circuit and the signal line during the low-frequency image refresh is as shown in FIGS. 2 and 3, and the connection between the pixel circuit and the signal line during the high-frequency image refresh is as shown in FIG. 4).

In conjunction with FIGS. 2 to 4 and with reference to FIGS. 9 and 10, in the write frame during the low-frequency image refresh and the write frame during the high-frequency image refresh, the working process of the pixel circuit may include a data write stage t1, a threshold compensation stage t4, a control potential write stage t2, and a light emission stage t3. In some optional embodiments of the present disclosure, the threshold compensation stage t4 further includes the data write stage t1. In some optional embodiments of the present disclosure, the threshold compensation stage t4 further includes the control potential write stage t2.

The working process of the pixel circuit in the write frame during the low-frequency image refresh is the same as the working process in the write frame during the low-frequency image refresh and high-frequency image refresh in the above embodiments in which the connection between the pixel circuit and the signal line is as shown in FIGS. 2 and 3, and the details are not repeated here. The working process of the pixel circuit in the retention frame during the low-frequency image refresh is the same as the working process in the retention frame during the low-frequency image refresh and high-frequency image refresh in the above embodiments in which the connection between the pixel circuit and the signal line is as shown in FIGS. 2 and 3, and the details are not repeated here.

When one display cycle includes multiple write frames, the working process of the pixel circuit in the write frame is different from the working process in the write frame during the low-frequency image refresh and high-frequency image refresh in the above embodiments in which the connection between the pixel circuit and the signal line is as shown in FIGS. 2 and 3, and the details are not repeated here. With reference to FIGS. 4, 9, and 10, specifically, when one display cycle includes multiple write frames, the working process of the pixel circuit in the write frame is as follows.

In the data write stage t1 (the threshold compensation stage t4), the first control signal Ctrl1 is an effective potential signal, and the first data write module 120 (the second write transistor T3) is turned on to write the grayscale data voltage to the gate node G1; at the same time, the third control signal Ctrl3 is an effective potential signal, and the compensation module 140 (the compensation transistor T4) is turned on to write the threshold voltage of the drive transistor DT to the gate node G1.

In the control potential write stage t2, the second control signal Ctrl2 is an effective potential signal, and the write unit 131 (the first write transistor T2) is turned on to write the global data voltage to the control node B1 to enable the control node B1 to have the control potential which is the third potential capable of enabling the first light emission control module 112 to be turned on.

In the light emission stage t3, the light emission control signal EM is an effective potential signal, and the first light emission control unit 161 (the second light emission control transistor T5) and the second light emission control unit 162 (the third light emission control transistor T6) are turned on. Since the control potential written to the control node B1 in the control potential write stage t2 is the third potential and the storage unit 132 has the function of storing the potential of the control node B1, in the light emission stage t3, the first light emission control module 112 (the first light emission control transistor T1) is turned on, the drive current generated by the drive module 111 according to the grayscale data voltage corresponding to a grayscale is transmitted to the light-emitting module 113, and the light-emitting module 113 is illuminated, thereby achieving the image display at different grayscales. Therefore, the pixel circuit in the embodiments here is compatible with the multi-grayscale image display during the high-frequency image refresh in the related art.

Figure 13:
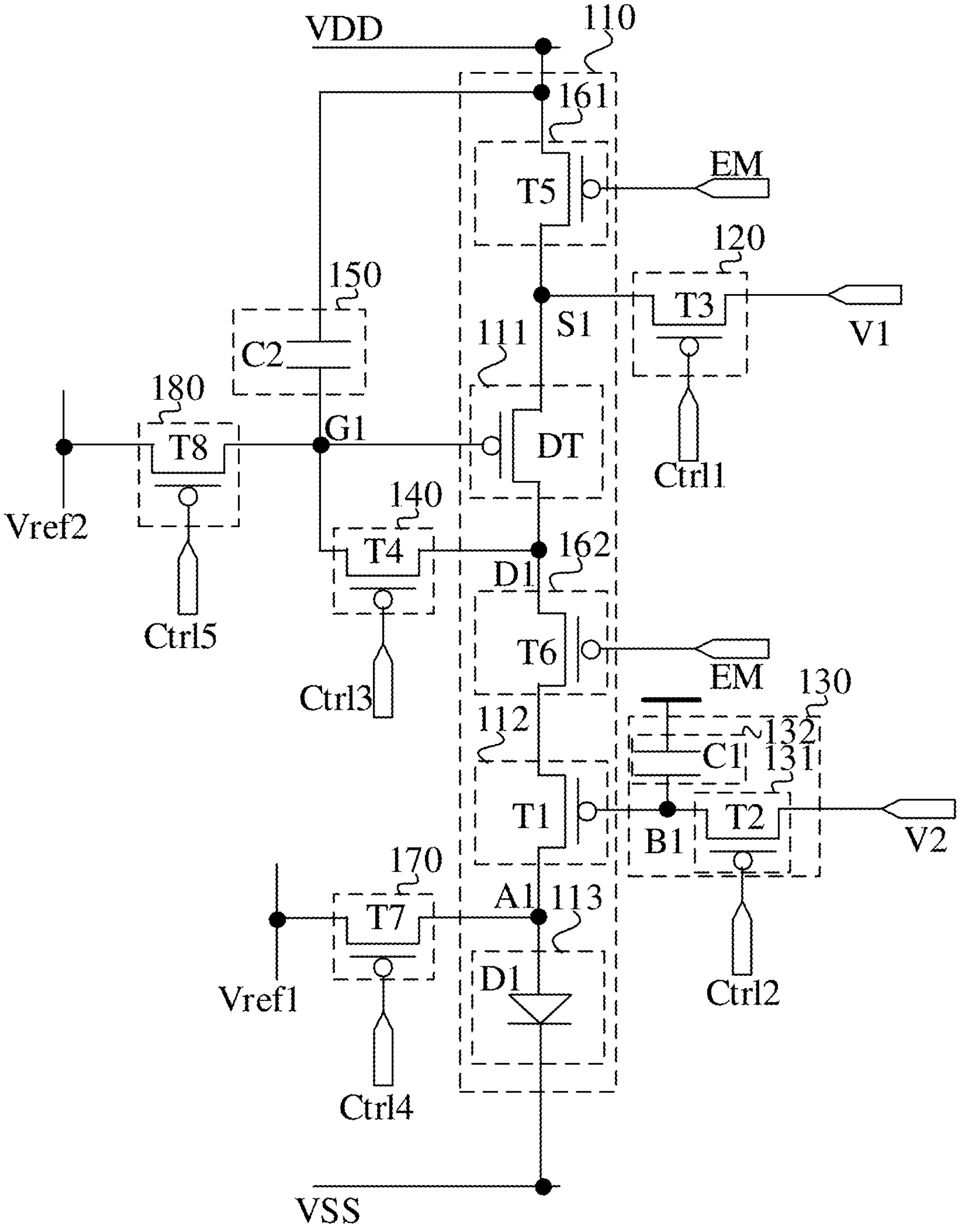
FIG. 13 is a structure diagram of another pixel circuit according to one or more embodiments of the present disclosure.

FIG. 13 is a structure diagram of another pixel circuit according to one or more embodiment of the present disclosure. With reference to FIG. 13, the first voltage input terminal V1 is configured to be connected to the first global signal line VDH and the second voltage input terminal V2 is configured to be connected to the data line Data when one display cycle includes one write frame and multiple retention frames; and the first voltage input terminal V1 is configured to be connected to the data line Data and the second voltage input terminal V2 is configured to be connected to the second global signal line VBH when one display cycle includes multiple write frames (that is, the connection between the pixel circuit and the signal line during the low-frequency image refresh is as shown in FIGS. 2 and 3, and the connection between the pixel circuit and the signal line during the high-frequency image refresh is as shown in FIG. 4). On the basis of the structure of the pixel circuit shown in FIG. 9, optionally, the pixel circuit further includes a second reset module 180. The second reset module 180 is coupled between a second reset signal line Vref2 and the gate node G1. In the write frame during the low-frequency image refresh, the second reset module 180 is configured to write a second reset voltage on the second reset signal line Vref2 to the gate node G1 in the second reset stage, thereby avoiding the influence of the residual charge of the gate node G1 in the previous frame on the display in the current frame. Optionally, in the write frame during the high-frequency image refresh and the retention frame during the low-frequency image refresh, the second reset module 180 is also configured to write the second reset voltage on the second reset signal line Vref2 to the gate node G1 in the second reset stage. Optionally, the second reset module 180 includes a second reset transistor T8, and the gate of the second reset transistor T8 may access a fifth control signal Ctrl5. Optionally, in the write frame during the low-frequency image refresh, the second reset module 180 is configured to, in response to an effective potential of the fifth control signal Ctrl5, write the second reset voltage on the second reset signal line Vref2 to the gate node G1 in the second reset stage. When the fifth control signal Ctrl5 is an effective potential, the second reset transistor T8 is turned on and writes the second reset voltage to the gate node G1.

Figure 14:
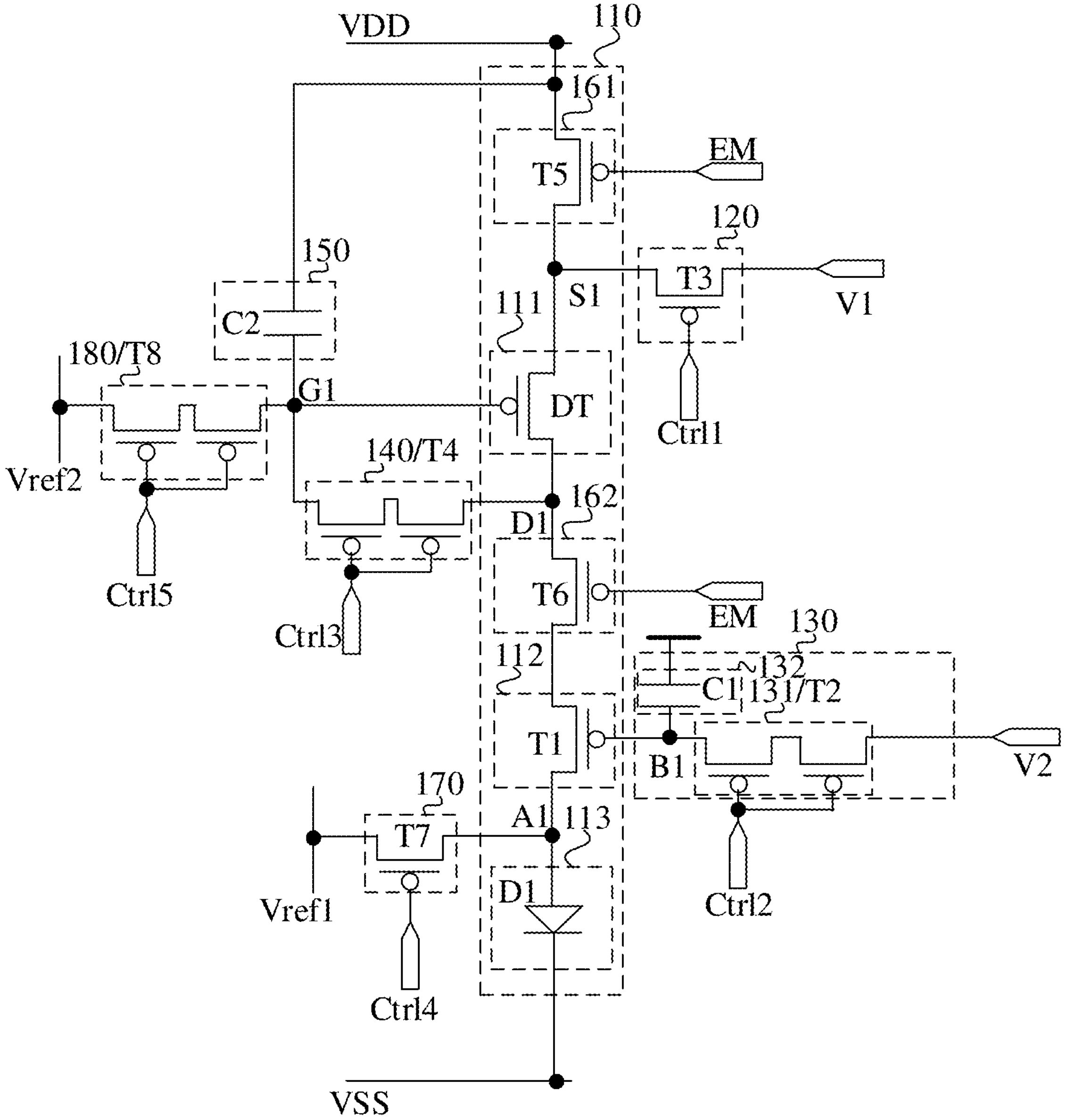
FIG. 14 is a structure diagram of another pixel circuit according to one or more embodiments of the present disclosure.

FIG. 14 is a structure diagram of another pixel circuit according to one or more embodiments of the present disclosure. With reference to FIG. 14, optionally, the first write transistor T2 included in the write unit 131 is a dual-gate transistor. Specifically, the first write transistor T2 includes a first dual-gate transistor. The gate of the first dual-gate transistor accesses the second control signal Ctrl2. In conjunction with FIGS. 2, 3, and 14, the source of the first dual-gate transistor is coupled to the data line Data, and the drain of the first dual-gate transistor is coupled to the control node B1. By setting the write unit 131 to include the first dual-gate transistor, the leakage current of the write unit 131 can be reduced, thereby helping improve the display effect. Optionally, the compensation transistor T4 included in the compensation module 140 is a dual-gate transistor. Specifically, the compensation transistor T4 includes a second dual-gate transistor, the gate of the second dual-gate transistor accesses the third control signal Ctrl3, and the second dual-gate transistor is coupled between the drain D1 and the gate G1 of the drive transistor DT. By setting the compensation module 140 to include the second dual-gate transistor, the leakage current of the compensation module 140 can be reduced, thereby helping improve the display effect.

Optionally, the second reset transistor 180 included in the second reset module 180 is a dual-gate transistor. Specifically, the second reset transistor T8 includes a third dual-gate transistor, the gate of the third dual-gate transistor accesses the fifth control signal Ctrl5, and the third dual-gate transistor is coupled between the second reset signal line Vref2 and the gate node G1 of the drive transistor DT. By setting the second reset transistor 180 to include the third dual-gate transistor, the leakage current of the second reset transistor 180 can be reduced, thereby helping improve the display effect.

On the basis of the above solutions, optionally, the second reset stage does not overlap the threshold compensation stage, and the second reset stage precedes the threshold compensation stage, Therefore, the drive transistor DT may be on in the threshold compensation stage and the data write stage so that the first data write module 120 can fully write the voltage on a corresponding connection signal line to the gate node G1 and the compensation module 140 can fully write the threshold voltage of the drive transistor DT to the gate node G1.

Figure 15:
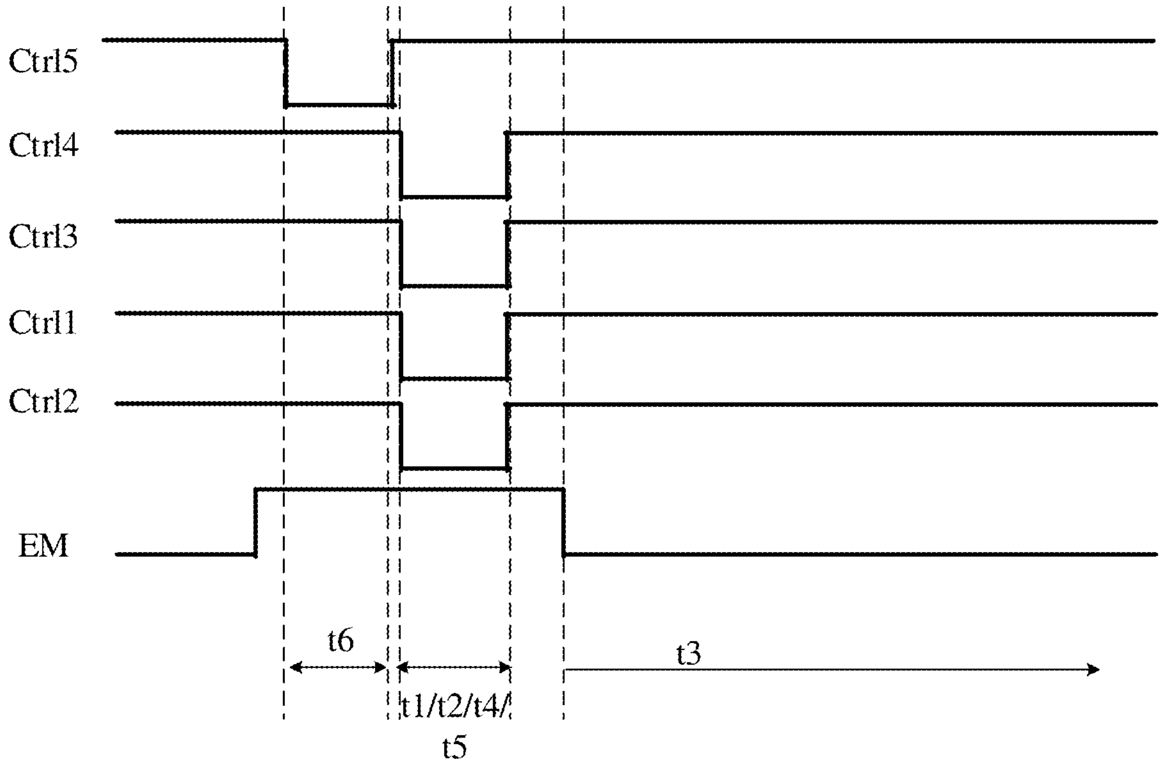
FIG. 15 is a drive timing diagram of the pixel circuit shown in FIGS. 13 and 14 in a write frame during high-frequency image refresh and low-frequency image refresh.
Figure 16:
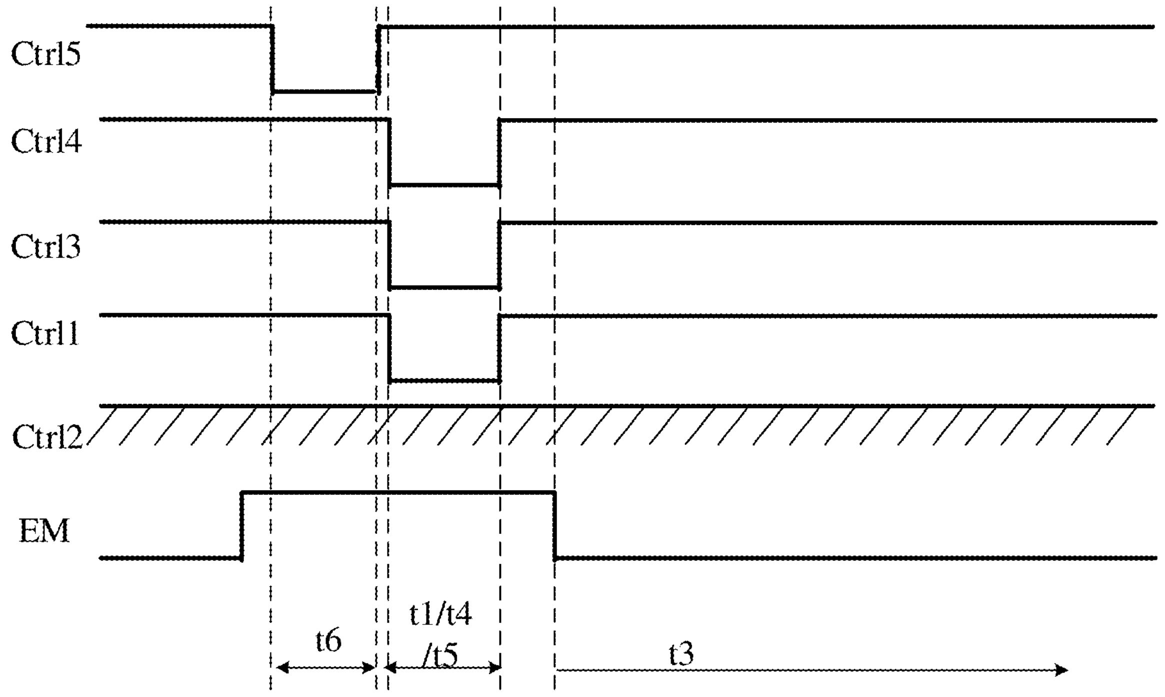
FIG. 16 is a drive timing diagram of the pixel circuit shown in FIGS. 13 and 14 in a retention frame during the low-frequency image refresh.

FIG. 15 is a drive timing diagram of the pixel circuit shown in FIGS. 13 and 14 in a write frame during high-frequency image refresh and low-frequency image refresh, and FIG. 16 is a drive timing diagram of the pixel circuit shown in FIGS. 13 and 14 in a retention frame during the low-frequency image refresh. The drive timing shown in FIGS. 15 and 16 may correspond to the case where the first voltage input terminal V1 is configured to be connected to the first global signal line VDH and the second voltage input terminal V2 is configured to be connected to the data line Data when one display cycle includes one write frame and multiple retention frames and may correspond to the case where the first voltage input terminal V1 is configured to be connected to the data line Data and the second voltage input terminal V2 is configured to be connected to the second global signal line VBH when one display cycle includes multiple write frames (that is, the connection between the pixel circuit and the signal line during the low-frequency image refresh is as shown in FIGS. 2 and 3, and the connection between the pixel circuit and the signal line during the high-frequency image refresh is as shown in FIG. 4).

In conjunction with FIGS. 2 and 3 and with reference to FIGS. 13 to 15, in the write frame during the low-frequency image refresh and the write frame during the high-frequency image refresh, the working process of the pixel circuit included a second reset stage t6, a first reset stage t5, a data write stage t1, a threshold compensation stage t4, a control potential write stage t2, and a light emission stage t3.

In the second reset stage t6, the fifth control signal Ctrl5 is at an effective potential, and the second reset transistor T8 is turned on and writes the second reset voltage to the gate node G1.

The working processes of the first reset stage t5, the data write stage t1, the threshold compensation stage t4, the control potential write stage t2, and the light emission stage t3 in the write frame during the low-frequency image refresh are the same as the working processes of the first reset stage t5, the data write stage t1, the threshold compensation stage t4, the control potential write stage t2, and the light emission stage t3 in the write frame during the low-frequency image refresh according to the drive timing shown in FIG. 10 in the case where the connection between the pixel circuit shown in FIG. 9 and the signal line during the low-frequency image refresh is as shown in FIGS. 2 and 3 and the connection between the pixel circuit and the signal line during the high-frequency image refresh is as shown in FIG. 4, respectively, and the details are not repeated here.

The working processes of the first reset stage t5, the data write stage t1, the threshold compensation stage t4, the control potential write stage t2, and the light emission stage t3 in the write frame during the high-frequency image refresh are the same as the working processes of the first reset stage t5, the data write stage t1, the threshold compensation stage t4, the control potential write stage t2, and the light emission stage t3 in the write frame during the high-frequency image refresh according to the drive timing shown in FIG. 10 in the case where the connection between the pixel circuit shown in FIG. 9 and the signal line during the low-frequency image refresh is as shown in FIGS. 2 and 3 and the connection between the pixel circuit and the signal line during the high-frequency image refresh is as shown in FIG. 4, respectively, and the details are not repeated here.

The first reset stage t5, the data write stage t1, the threshold compensation stage t4, and the control potential write stage t2 may overlap, which is illustrated in the drive timing in FIG. 15.

In conjunction with FIGS. 2 and 3 and with reference to FIGS. 13, 14, and 16, in the retention frame during the low-frequency image refresh, the working process of the pixel circuit includes a second reset stage t6, a first reset stage t5, a data write stage t1, a threshold compensation stage t4, and a light emission stage t3.

In the second reset stage t6, the fifth control signal Ctrl5 is at an effective potential, and the second reset transistor T8 is turned on and writes the second reset voltage to the gate node G1.

The working processes of the first reset stage t5, the data write stage t1, the threshold compensation stage t4, and the light emission stage t3 in the retention frame during the low-frequency image refresh are the same as the working processes of the first reset stage t5, the data write stage t1, the threshold compensation stage t4, and the light emission stage t3 in the retention frame during the low-frequency image refresh according to the drive timing shown in FIG. 10 in the case where the connection between the pixel circuit shown in FIG. 9 and the signal line during the low-frequency image refresh is as shown in FIGS. 2 and 3 and the connection between the pixel circuit and the signal line during the high-frequency image refresh is as shown in FIG. 4, respectively, and the details are not repeated here.

It is to be noted that in the above embodiments of the present disclosure, the high frequency and the low frequency are relative concepts. For example, when the image refresh frequency is higher than a set frequency, the image refresh is the high-frequency image refresh, and when the image refresh frequency is less than or equal to the set frequency, the image refresh is the low-frequency image refresh, where the set frequency may be set according to actual requirements.

Figure 17:
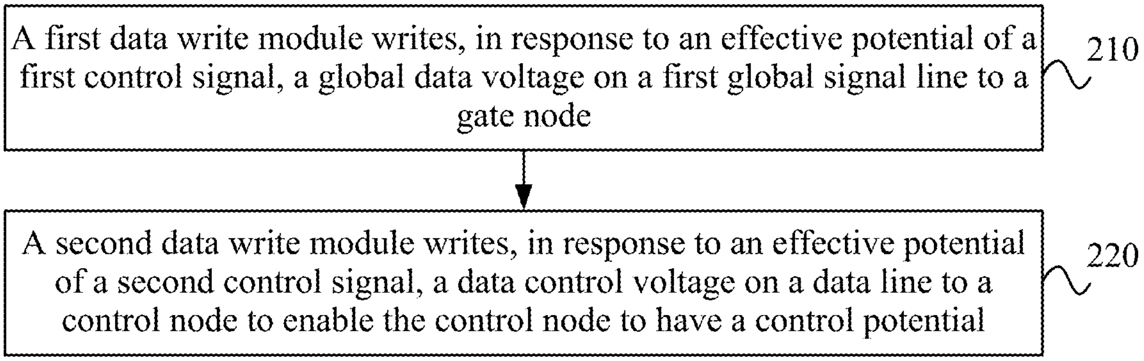
FIG. 17 is a flowchart of a driving method of a pixel circuit according to one or more embodiments of the present disclosure.

The embodiments of the present disclosure further provide a driving method of a pixel circuit. The driving method of a pixel circuit is used for driving the pixel circuit provided by any of the above embodiments of the present disclosure. FIG. 17 is a flowchart of a driving method of a pixel circuit according to one or more embodiments of the present disclosure. With reference to FIG. 17, the driving method of a pixel circuit includes steps 210 and 220.

In step 210, a first data write module writes, in response to an effective potential of a first control signal, a global data voltage on a first global signal line to a gate node.

In step 220, a second data write module writes, in response to an effective potential of a second control signal, a data control voltage on a data line to a control node to enable the control node to have a control potential.

Optionally, one display cycle includes at least one write frame.

Optionally, the step 220 includes: the second data write module writes, in response to the effective potential of the second control signal, the data control voltage on the data line to the control node in the write frame to enable the control node to have the control potential.

Optionally, one display cycle further includes at least one retention frame; the driving method further includes: the second data write module maintains the potential of the control node at the control potential in the retention frame.

Optionally, a first light emission control module is controlled by the data control voltage to be turned on or turned off. The driving method of a pixel circuit in the embodiments here is used for driving the pixel circuit provided by any of the above embodiments of the present disclosure and thus has the beneficial effects of the pixel circuit provided by any of the above embodiments of the present disclosure, and the details are not repeated here.

Figure 18:
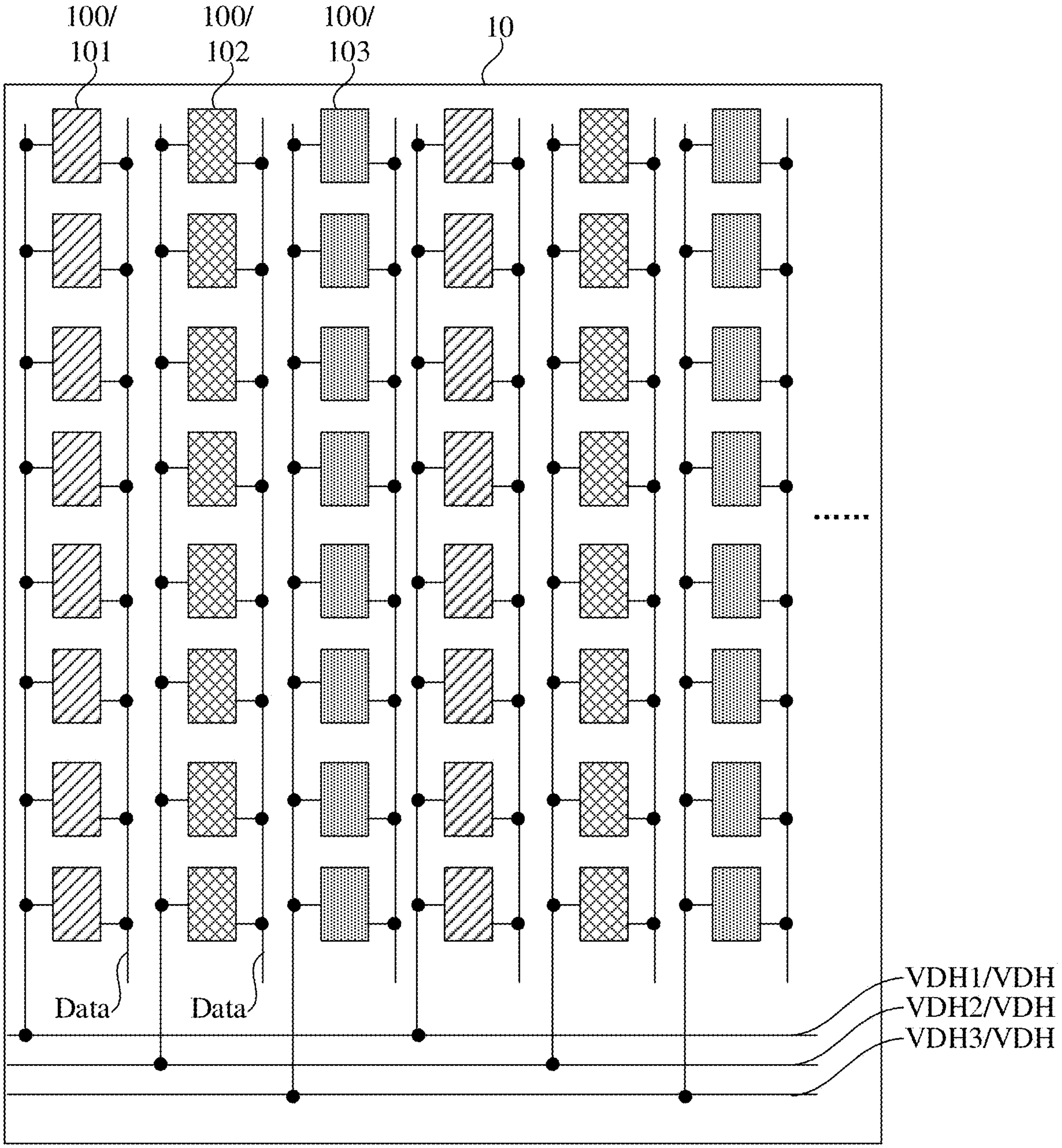
FIG. 18 is a structure diagram of a display panel according to one or more embodiments of the present disclosure.

The embodiments of the present disclosure further provide a display panel. FIG. 18 is a structure diagram of a display panel according to one or more embodiments of the present disclosure. With reference to FIG. 18, the display panel 10 includes multiple pixel circuits 100 provided by any of the above embodiments of the present disclosure, multiple first global signal lines VDH, and multiple data lines Data. The multiple pixel circuits 100 are arranged in multiple columns. When one display cycle of the display panel includes one write frame and multiple retention frames, the first data write module 120 in each of pixel circuits of the same color is coupled to the same first global signal line VDH, the second data write module 130 in each of pixel circuits 100 in the same column is coupled to the same data line Data. Different first global signal lines VDH are configured with global data voltages having different voltage values, different data lines Data are configured with corresponding data control voltages, and the data control voltage corresponds to the display image of the display panel.

The color of the pixel circuit 100 refers to the color of the light emitted by the light-emitting module in the pixel circuit 100. The display panel including light-emitting modules of three emitted colors is illustrated in FIG. 18, that is, the display panel includes pixel circuits 100 of three colors. Optionally, the pixel circuits 100 in the same column are of the same color. For example, the pixel circuits 100 of three colors are denoted as first pixel circuits 101, second pixel circuits 102, and third pixel circuits 103. The first pixel circuits 101 correspond to the color of red, the second pixel circuits 102 correspond to the color of green, and the third pixel circuits 103 correspond to the color of blue. When the display cycle includes one write frame and multiple retention frames, the first data write modules 120 in the first pixel circuits 101 are coupled to the $1^{st}$ first global signal line VDH1; when the display cycle includes one write frame and multiple retention frames, the first data write modules 120 in the second pixel circuits 102 are coupled to the $2^{nd}$ first global signal line VDH2; when the display cycle includes one write frame and multiple retention frames, the first data write modules 120 in the third pixel circuits 103 are coupled to the $3^{rd}$ first global signal line VDH3.

Due to the different luminescence efficiencies of light-emitting modules of different emitted colors, the corresponding drive currents in the same display grayscale are also different. The global data voltage corresponds to the display brightness level and, specifically, may correspond to the grayscale data voltage corresponding to a set grayscale at the display brightness level. In the embodiments here, the first data write modules 120 in the pixel circuits 100 of the same color are coupled to the same first global signal line VDH so that the first data write modules 120 in the pixel circuits 100 of the same color are provided with the same global data voltage, and the first data write modules 120 in the pixel circuits 100 of different colors are provided with different global data voltages to ensure that the drive currents flowing through the different light-emitting modules of different emitted colors at the same display brightness level are different so that the light-emitting modules of different emitted colors can reach the target brightness corresponding to the set grayscale at the display brightness level, thereby improving the display effect.

In addition, in the embodiments here, the second data write module 130 in each of pixel circuits 100 in the same column is coupled to the same data line Data, different data lines Data are configured with corresponding data control voltages, and the data control voltage corresponds to the display image of the display panel. Specifically, when the display cycle includes one write frame and multiple retention frames, in the write frame, the data control voltages on the data lines Data may jump depending on the light emission states of the light-emitting modules in different pixel circuits 100 in the display image. When the light emission state of a pixel module is illuminated, the data control voltage on the data line Data has a first potential when the data control voltage is transmitted to the pixel circuit 100 so that the first light emission control module 112 in the pixel circuit 100 is turned on; when the light emission state of the pixel module is not illuminated, the data control voltage on the data line Data has a second potential when the data control voltage is transmitted to the pixel circuit 100 so that the first light emission control module 112 in the pixel circuit 100 is turned off.

With continued reference to FIG. 18, optionally, when one display cycle includes multiple write frames, the first data write module 120 in each of pixel circuits 100 of the same color is coupled to the same first global signal line VDH, and the second data write module 130 in each of pixel circuits 100 in the same column is coupled to the same data line Data. Different first global signal lines VDH are configured with global data voltages having different voltage values, different data lines Data are configured with corresponding data control voltages, and the data control voltage corresponds to the display image of the display panel. The pixel circuit 100 included in the display panel may be the pixel circuit 100 shown in FIGS. 1 to 3 where the first data write module 120 is configured to be connected to the first global signal line VDH and the second data write module 130 is configured to be connected to the data line Data during the low-frequency image refresh and the high-frequency image refresh.

During the low-frequency image refresh, if the display image of the display panel in the second set of write frames and retention frames does not need to change relative to the first set of write frames and retention frames, the corresponding data control voltage of the pixel circuit does not change, and accordingly, the conduction state of the first light emission control module 112 in the pixel circuit does not change, and the light emission state of the light-emitting module 113 in the pixel circuit does not change; if the display image of the display panel in the second set of write frames and retention frames needs to change relative to the first set of write frames and retention frames, the corresponding data control voltage of the pixel circuit may need to change, and accordingly, the conduction state of the first light emission control module 112 in the pixel circuit changes, and the light emission state of the light-emitting module 113 in the pixel circuit changes. In this manner, the data control voltage corresponds to the display image of the display panel.

Figure 19:
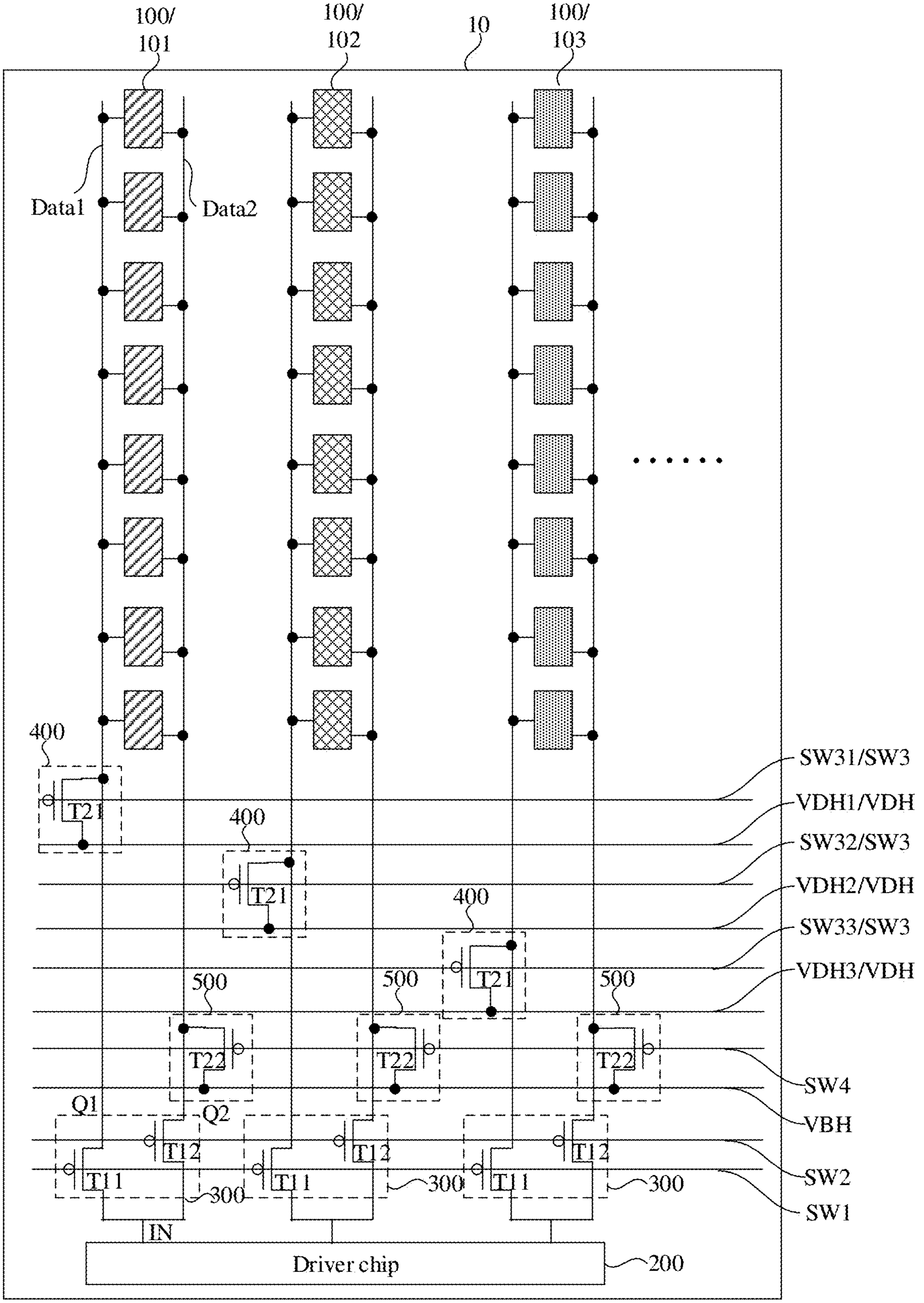
FIG. 19 is a structure diagram of another display panel according to one or more embodiments of the present disclosure.

FIG. 19 is a structure diagram of another display panel according to one or more embodiments of the present disclosure. With reference to FIG. 19, optionally, the display panel further includes a second global signal line VBH. When one display cycle of the display panel includes multiple write frames, the first data write module 120 in each of pixel circuits 100 in the same column is coupled to the same data line Data, and the second data write module 130 in each of the multiple pixel circuits 100 is coupled to the second global signal line VBH. The second global signal line VBH is configured with a global control voltage, different data lines Data are configured with corresponding grayscale data voltages, and the grayscale data voltage corresponds to a target grayscale of the pixel circuit 100 coupled to the different data line Data.

The display panel may achieve the multi-grayscale image display during the high-frequency image refresh. In this case, the first data write modules 120 in the pixel circuits 100 are coupled to the data lines Data. Specifically, the first data writes module 120 in the pixel circuits 100 in the same column are coupled to the same data line Data, the data line Data is configured to provide the corresponding connected pixel circuits 100 with a corresponding grayscale data voltage, and the grayscale data voltages corresponding to different pixel circuits 100 may be different depending on different display grayscales corresponding to the pixel circuits 100. The second data write modules 130 in the pixel circuits 100 are coupled to the second global signal line VBH. The voltage on the second global signal line VBH is configured to be a global control voltage, and the global control voltage may have a third potential. The third potential may enable the first light emission control module 112 in the pixel circuit 100 to turned be on so that the first light emission control modules 112 in all the pixel circuits 100 in the display panel are turned on during the high-frequency image refresh. The high-frequency image refresh is controlled by writing data at a high frequency by the second data write module 130 to the gate node G1 of the drive module 111 in the pixel circuit 100.

With continued reference to FIG. 19, on the basis of the above solutions, optionally, the display panel further includes a driver chip 200, a multiplex selection circuit 300, a first control circuit 400, and a second control circuit 500. The data line Data includes a first data line Data1 and a second data line Data2. The first data write module 120 in each of pixel circuits 100 in the same column is coupled to the same first data line Data1, and the second data write module 130 in each of pixel circuits 100 in the same column is coupled to the same second data line Data2. The driver chip 200 includes multiple data signal output terminals corresponding to the pixel circuits 100 in multiple columns. The input terminal IN of the multiplex selection circuit 300 is electrically coupled to one data signal output terminal, the first output terminal Q1 of the multiplex selection circuit 300 is electrically coupled to one first data line Data1, and the second output terminal Q2 of the multiplex selection circuit 300 is electrically coupled to one second data line Data2. The multiplex selection circuit 300 is configured to, when one display circle includes one write frame and multiple retention frames, select the input terminal IN of the multiplex selection circuit 300 to be coupled to the second output terminal Q2. The first control circuit 400 is coupled to the first global signal line VDH and coupled to one first data line Data1, and the first control circuit 400 is configured to, when one display cycle includes one write frame and multiple retention frames, couple the first global signal line VDH to the corresponding first data line Data1. The second control circuit 500 is coupled to the second global signal line VBH and one second data line Data2, and the second control circuit 500 is configured to, when one display cycle includes one write frame and multiple retention frames, disconnect the second global signal line VBH from the second data line Data2. The multiplex selection circuit 300 is configured to, when one display circle includes multiple write frames, select the input terminal IN of the multiplex selection circuit 300 to be coupled to the first output terminal Q1. The first control circuit 400 is configured to, when one display cycle includes multiple write frames, disconnect the first global signal line VDH from the corresponding first data line Data1. The second control circuit 500 is coupled to the second global signal line VBH and is configured to, when one display cycle includes multiple write frames, couple the second global signal line VBH to the corresponding second data line Data2.

The multiplex selection circuits 300 are in one-to-one correspondence with the columns of pixel circuits, the first control circuits 400 are in one-to-one correspondence with the columns of pixel circuits, and the second control circuits 500 are in one-to-one correspondence with the columns of pixel circuits. The multiplex selection circuits 300, the first control circuits 400, and the second control circuits 500 may be disposed inside the driver chip 200 or outside the driver chip 200, which is not specifically limited to the embodiments of the present disclosure.

Specifically, the working process of the display panel is as follows. During the low-frequency image refresh, the input terminal of the multiplex selection circuit 300 is coupled to the second output terminal Q2 so that the data signal output terminal of the driver chip 200 is electrically connected to the second data line Data2. The driver chip 200 outputs the corresponding data control voltage to the second data line Data2 so that the second data write module 130 can write the data control voltage to the control node B1 in the control potential writ stage t2. The first control circuit 400 couples the first global signal line VDH to the corresponding first data line Data1 so that the global data voltage on the first global signal line VDH is transmitted to the first data line Data1 and the first data write module 120 can write the global data voltage to the gate node G1 in the data write stage t1. The second control circuit 500 disconnects the second global signal line VBH from the second data line Data2 so that the global control voltage on the second global signal line VBH is not transmitted to the second data line Data2.

During the high-frequency image refresh, the input terminal of the multiplex selection circuit 300 is coupled to the first output terminal Q1 so that the data signal output terminal of the driver chip 200 is electrically connected to the first data line Data1. The driver chip 200 outputs the corresponding grayscale data voltage to the first data line Data1 so that the first data write module 120 can write the grayscale data voltage to the gate node G1 in the data write stage t1. The first control circuit 400 disconnects the first global signal line VDH from the corresponding first data line Data1 so that the global data voltage on the first global signal line VDH is not transmitted to the first data line Data1. The second control circuit 500 couples the second global signal line VBH to the corresponding second data line Data2 so that the global control voltage on the second global signal line VBH is transmitted to the corresponding second data line Data2 and the second data write module 130 can write the global control voltage to the control node B1 in the control potential write stage t2, thereby enabling the first light emission control module 112 in the pixel circuit 100 to be turned on.

Optionally, the first control circuits 400 connected to the first data lines Data1 connected to pixel circuits 100 of the same color are connected to the same first global signal line VDH, and first control circuits 400 connected to the first data lines Data1 connected to pixel circuits 100 of different colors are connected to different first global signal lines VDH.

FIG. 19 is still illustrated with an example where the display panel includes first pixel circuits 101, second pixel circuits 102, and third pixel circuits 103. The first control circuit 400 connected to the first data line Data1 connected to the first pixel circuits 101 is connected to the $1^{st}$ first global signal line VDH1, the first control circuit 400 connected to the first data line Data1 connected to the second pixel circuits 102 is connected to the $2^{nd}$ first global signal line VDH2, and the first control circuit 400 connected to the first data line Data1 connected to the third pixel circuits 103 is connected to the $3^{rd}$ first global signal line VDH3.

With continued reference to FIG. 19, optionally, the multiplex selecting circuit 300 includes a first selection transistor T11 and a second selection transistor T12. The first electrode of the first selection transistor T11 is electrically connected to a corresponding data signal output terminal, and the second electrode of the first selection transistor T11 is electrically connected to the first output terminal Q1. The first electrode of the second selection transistor T12 is electrically connected to a corresponding data signal output terminal, and the second electrode of the second selection transistor T12 is electrically connected to the second output terminal Q2. The gate of the first selection transistor T11 is connected to a first selection signal line SW1, and the gate of the second selection transistor T12 is connected to a second selection signal line SW2.

Specifically, during the low-frequency image refresh, the driver chip 200 may output a turn-off control signal to the first selection signal line SW1 and a turn-on control signal to the second selection signal line SW2, the second selection transistor T12 is then turned on, and the first selection transistor T11 is turned off so that the connection between the input terminal IN and the second output terminal Q2 of the multiplex selection circuit 300 is conducted and the connection between the input terminal IN and the first output terminal Q1 of the multiplex selection circuit 300 is cut off. During the high-frequency image refresh, the driver chip 200 may output a turn-off control signal to the second selection signal line SW2 and a turn-on control signal to the first selection signal line SW1, the first selection transistor T11 is then turned on, and the second selection transistor T12 is turned off so that the connection between the input terminal IN and the first output terminal Q1 of the multiplex selection circuit 300 is conducted and the connection between the input terminal IN and the second output terminal Q2 of the multiplex selection circuit 300 is cut off.

Optionally, the first control circuit 400 includes a first control transistor T21. The first electrode of the first control transistor T21 is connected to a corresponding first global signal line VDH, the second electrode of the first control transistor T21 is connected to a corresponding first data line Data1, and the gate of the first control transistor T21 is connected to a third selection signal line SW3. The third selection signal lines SW3 connected to the first control transistors T21 connected to pixel circuits 100 of different colors are different.

Still taking the example where the display panel includes first pixel circuits 101, second pixel circuits 102, and third pixel circuits 103, the display panel may include a third selection signal line one SW31, a third selection signal line two SW32, and a third selection signal line three SW33. In the first control circuit 400 connected to the first pixel circuits 101, the gate of the first control transistor T21 is connected to the 1st third selection signal line SW31, and the first electrode of the first control transistor T21 is connected to the 1st first global signal line VDH1; in the first control circuit 400 connected to the second pixel circuits 102, the gate of the first control transistor T21 is connected to the 2"d third selection signal line SW32, and the first electrode of the first control transistor T21 is connected to the 2nd first global signal line VDH2; in the first control circuit 400 connected to the third pixel circuits 103, the gate of the first control transistor T21 is connected to the 3rd third selection signal line SW33, and the first electrode of the first control transistor T21 is connected to the 3rd first global signal line VDH3.

Specifically, during the low-frequency image refresh, the driver chip 200 may output a turn-on control signal to each of the third selection signal lines SW3, then each of the first control transistors T21 is turned on, the connection between the first global signal line VDH and the corresponding first data line Data1 is conducted, and the voltage on the first data line Data1 is the global data voltage on the corresponding first global signal line VDH. During the high-frequency image refresh, the driver chip 200 may output a turn-off control signal to each of the third selection signal lines SW3, then each of the first control transistors T21 is turned off, and the connection between the first global signal line VDH and the corresponding first data line Data1 is cut off.

Optionally, the second control circuit 500 includes a second control transistor T22. The first electrode of the second control transistor T22 is connected to a corresponding second global signal line VBH, the second electrode of the second control transistor T22 is connected to a corresponding second data line Data2, and the gate of the second control transistor T22 is connected to a fourth selection signal line SW4.

Specifically, during the low-frequency image refresh, the driver chip 200 may output a turn-off control signal to the fourth selection signal line SW4, then each of the second control transistors T22 is turned off, and the connection between the second global signal line VBH and the corresponding second data line Data2 is cut off. During the high-frequency image refresh, the driver chip 200 may output a turn-on control signal to the fourth selection signal line SW4, then each of the second control transistors T22 is turned on, the connection between the second global signal line VBH and the corresponding second data line Data2 is conducted, and the voltage on the second data line Data2 is the global data voltage on the corresponding second global signal line VBH.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations, and substitutions can be made without departing from the scope of the present disclosure. Therefore, although the present disclosure has been described in detail through the preceding embodiments, the present disclosure is not limited to the preceding embodiments and may include other equivalent embodiments without departing from the concept of the present disclosure. The scope of the present disclosure is determined by the scope of the appended claims.

What is claimed is:

1. A pixel circuit, comprising:

a first data write module;

a second data write module; and a drive module, a first light emission control module, and a light-emitting module sequentially connected in series, wherein the drive module has a gate node, the first light emission control module has a control node, and the light-emitting module is controlled to perform low-frequency image refresh or high-frequency image refresh;

in response that the light-emitting module is controlled to perform the low-frequency image refresh, first data write module, connected between a first global signal line and the drive module and configured to, in response to an effective potential of a first control signal, write a global data voltage on the first global signal line to the gate node; and second data write module, connected between a data line and the control node, and is configured to, in response to an effective potential of a second control signal, write a data control voltage on the data line to the control node to enable the control node to have a control potential; and in response that the light-emitting module is controlled to perform the high-frequency image refresh, the first data write module is connected between the data line and the drive module, and configured to, in response to the effective potential of the first control signal, write a grayscale data voltage on the data line to the gate node; and the second data write module is connected between a second global signal line and the control node, and configured to, in response to the effective potential of the second control signal, write a global control voltage on the second global signal line to the control node to enable the control node to have the control potential.

2. The pixel circuit according to claim 1, wherein one display cycle of the pixel circuit comprises at least one write frame, and the second data write module is configured to, in response to the effective potential of the second control signal, write the data control voltage on the data line to the control node in the at least one write frame to enable the control node to have the control potential.

3. The pixel circuit according to claim 1, wherein the first light emission control module is controlled by the data control voltage to be turned on or turned off.

4. The pixel circuit according to claim 2, wherein the first light emission control module comprises a first light emission control transistor, and a gate of the first light emission control transistor is electrically connected to the control node;

the data control voltage is configured to enable the first light emission control transistor to operate in a linear region when the first light emission control transistor is controlled to be turned on by the data control voltage.

5. The pixel circuit according to claim 2, wherein the second data write module comprises a write unit and a storage unit, and the write unit and the storage unit are electrically connected to the control node, the display cycle further comprises at least one retention frame, the second data write module is further configured to maintain a potential of the control node at the control potential in the at least one retention frame; wherein:

the write unit is configured to, in response to the effective potential of the second control signal, write the data control voltage on the data line to the control node in the at least one write frame to enable the control node to have the control potential; the storage unit is configured to maintain the potential of the control node at the control potential in the at least one retention frame; and the write unit comprises a first dual-gate transistor, a gate of the first dual-gate transistor accesses the second control signal, a source of the first dual-gate transistor is coupled to the data line, and a drain of the first dual-gate transistor is coupled to the control node.

6. The pixel circuit according to claim 2, wherein when the display cycle comprises one write frame and a plurality of retention frames, the effective potential of the first control signal is configured to be generated in the write frame and at least one of the plurality of retention frames, or, the first control signal is configured to be maintained at the effective potential in at least one of the plurality of retention frames; and the effective potential of the second control signal is configured to be generated in the write frame.

7. The pixel circuit according to claim 6, wherein the drive module has a source node, and when the effective potential of the first control signal is configured to be generated in the write frame and the at least one of the plurality of retention frames, the first data write module is coupled to the source node; or when the first control signal is configured to be maintained at the effective potential in the at least one of the plurality of retention frames, the first data write module is coupled to the gate node.

8. The pixel circuit according to claim 2, wherein when the display cycle comprises a plurality of write frames.

9. The pixel circuit according to claim 8, wherein the display cycle further comprises at least one retention frame, wherein:

the effective potential of the first control signal is configured to be generated in each of the plurality of write frames and the at least one retention frame, and the effective potential of the second control signal are configured to be generated in each of the plurality of write frames;

the grayscale data voltage corresponds to a display grayscale, and voltage values of grayscale data voltages corresponding to different display grayscales of a same display brightness level are different; or when the display cycle comprises one write frame and a plurality of retention frames, the global data voltage corresponds to a display brightness level, voltage values of a global data voltage corresponding to a same display brightness level are the same, and voltage values of global data voltages corresponding to different display brightness levels are different; and the data control voltage has a first potential and a second potential, and the global control voltage has a third potential, wherein the first potential and the third potential are configured to enable the first light emission control module to be turned on, and the second potential is configured to enable the first light emission control module to be turned off.

10. The pixel circuit according to claim 2, wherein when the display cycle comprises a plurality of write frames, the first data write module is configured to be coupled between the first global signal line and the drive module and, in response to the effective potential of the first control signal, write the global data voltage to the gate node;

the second data write module is configured to be coupled between the data line and the control node and, in response to the effective potential of the second control signal, write the data control voltage to the control node in the plurality of write frames to enable the control node to have the control potential.

11. The pixel circuit according to claim 10, wherein at least one of the following configurations is satisfied:

the effective potential of the first control signal and the effective potential of the second control signal are configured to be generated in each of the plurality of write frames; or when one display cycle comprises a plurality of write frames or comprises one write frame and a plurality of retention frames, the global data voltage corresponds to a display brightness level, voltage values of the global data voltage corresponding to a same display brightness level are the same, and voltage values of global data voltages corresponding to different display brightness levels are different; and the data control voltage has a first potential and a second potential, wherein the first potential is configured to enable the first light emission control module to be turned on, and the second potential is configured to enable the first light emission control module to be turned off.

12. The pixel circuit according to claim 2, further comprising a compensation module and a second light emission control module, wherein the display cycle comprises one write frame and a plurality of retention frames; and in the write frame, the compensation module is configured to write a threshold voltage of a drive transistor in the drive module to the gate node in a threshold compensation stage;

the second data write module is configured to write the data control voltage to the control node in a control potential write stage to enable the control node to have the control potential;

the second light emission control module is configured to be turned off in the threshold compensation stage and the control potential write stage and to be turned on in a light emission stage.

13. The pixel circuit according to claim 12, wherein at least one of the following configurations is satisfied:

the threshold compensation stage does not overlap the control potential write stage;

the threshold compensation stage precedes the control potential write stage;

the first data write module is configured to write the global data voltage to the gate node in a data write stage;

the first data write module is configured to write the global data voltage to the gate node in a data write stage, and the threshold compensation stage further comprises the data write stage; and an interval exists between the control potential write stage and the light emission stage.

14. The pixel circuit according to claim 12, wherein at least one of the following configurations is satisfied:

the threshold compensation stage further comprises the control potential write stage;

the drive module further has a drain node, and the compensation module is coupled between the gate node and the drain node;

the drive module further has a source node and a drain node, the drive module, the first light emission control module, and the light-emitting module are coupled between a first power voltage line and a second power voltage line, the second light emission control module comprises a first light emission control unit and a second light emission control unit, the first light emission control unit is coupled between the first power voltage line and the source node, the second light emission control unit is coupled between the drain node and the light-emitting module, and the light-emitting module is coupled between the second light emission control unit and the second power voltage line;

the compensation module comprises a second dual-gate transistor;

the compensation module is configured to, in response to an effective potential of a third control signal, write a threshold voltage of a drive transistor in the drive module to the gate node in the threshold compensation stage; and the second light emission control module is configured to, in response to an effective potential of a light emission control signal, be turned off in the threshold compensation stage and the control potential write stage and configured to, in response to an ineffective potential of the light emission control signal, be turned on in the light emission stage.

15. The pixel circuit according to claim 12, wherein the drive module further has a source node and a drain node, the drive module, the first light emission control module, and the light-emitting module are coupled between a first power voltage line and a second power voltage line, the second light emission control module comprises a first light emission control unit and a second light emission control unit, the first light emission control unit is coupled between the first power voltage line and the source node, the second light emission control unit is coupled between the drain node and the light-emitting module, and the light-emitting module is coupled between the second light emission control unit and the second power voltage line, the light-emitting module has an anode node, the pixel circuit further comprises a first reset module, and the first reset module is coupled between a first reset signal line and the anode node, the first reset module is configured to write a first reset voltage on the first reset signal line to the anode node in a first reset stage; wherein the first light emission control module is coupled between the first power voltage line and the first light emission control unit; or the first light emission control module is coupled between the first light emission control unit and the source node; or the first light emission control module is coupled between the drain node and the second light emission control unit; or the first light emission control module is coupled between the second light emission control unit and the light-emitting module.

16. The pixel circuit according to claim 15, wherein at least one of the following configurations is satisfied:

the threshold compensation stage further comprises the first reset stage;

a working stage of the pixel circuit further comprises a power-on reset stage, and the power-on reset stage precedes a write frame of a first display cycle, wherein in the power-on reset stage, the compensation module and the second light emission control module are configured to be turned on, the first data write module is configured to write the global data voltage and the threshold voltage to the gate node through the drive module and the compensation module, and the second data write module is configured to turn on the first light emission control module;

the pixel circuit further comprises a second reset module, the second reset module is coupled between a second reset signal line and the gate node, and when the display cycle comprises one write frame and a plurality of retention frames, in the write frame, the second reset module is configured to write a second reset voltage on the second reset signal line to the gate node in the second reset stage;

the second reset stage does not overlap the threshold compensation stage, and the second reset stage precedes the threshold compensation stage;

the first reset module is configured to, in response to an effective potential of a fourth control signal, write the first reset voltage on the first reset signal line to the anode node in the first reset stage;

when the display cycle comprises one write frame and a plurality of retention frames, the second reset module is configured to, in response to an effective potential of a fifth control signal, write a second reset voltage on the second reset signal line to the gate node in the second reset stage; and the second reset module comprises a third dual-gate transistor.

17. A display panel, comprising:

a plurality of pixel circuits according to claim 1, wherein the plurality of pixel circuits are arranged in a plurality of columns; and a plurality of first global signal lines and a plurality of data lines, wherein when one display cycle comprises one write frame and a plurality of retention frames, first data write modules in pixel circuits of a same color are coupled to a same first global signal line, second data write modules in pixel circuits in a same column are coupled to a same data line, different first global signal lines are configured with global data voltages having different voltage values, different data lines are configured with corresponding data control voltages, and a data control voltage corresponds to a display image of the display panel.

18. The display panel according to claim 17, wherein at least one of the following configurations is satisfied:

the display panel further comprises a second global signal line, and when one display cycle comprises a plurality of write frames, first data write modules in pixel circuits in a same column are coupled to a same data line, and second data write modules in the plurality of pixel circuits are coupled to the second global signal line, wherein the second global signal line is configured with a global control voltage, different data lines are configured with corresponding grayscale data voltages, and a grayscale data voltage of the grayscale data voltages corresponds to a target grayscale of a pixel circuit coupled to a respective one of the different data lines;

a pixel circuit of the plurality of pixel circuits further comprises a compensation module and a second light emission control module, a control terminal of the compensation module accesses a third control signal, and a control terminal of a first light emission control unit and a control terminal of a second light emission control unit of the second light emission control module access a light emission control signal; a gate driving circuit for generating a first control signal, a gate driving circuit for generating the third control signal, and a gate driving circuit for generating the light emission control signal share a same clock signal;

a pixel circuit of the plurality of pixel circuits further comprises a first reset module and a second reset module, a control terminal of the first reset module accesses a fourth control signal, and a control terminal of the second reset module accesses a fifth control signal; the gate driving circuit for generating the first control signal, the gate driving circuit for generating the third control signal, a gate driving circuit for generating the fourth control signal, a gate driving circuit for generating the fifth control signal, and the gate driving circuit for generating the light emission control signal share a same clock signal; and the gate driving circuit for generating the first control signal, the gate driving circuit for generating the third control signal, the gate driving circuit for generating the fourth control signal, and the gate driving circuit for generating the fifth control signal are a same gate driving circuit.

19. The display panel according to claim 17, wherein the display panel further comprises a second global signal line, and when one display cycle comprises a plurality of write frames, first data write modules in pixel circuits in a same column are coupled to a same data line, and second data write modules in pixel circuits in a same column are coupled to the second global signal line;

the display panel further comprises a driver chip, a multiplex selection circuit, a first control circuit, and a second control circuit;

the plurality of data lines comprises a first data line and a second data line; first data write modules in pixel circuits in a same column are coupled to a same first data line, and second data write modules in pixel circuits in a same column are coupled to a same second data line;

the driver chip comprises a plurality of data signal output terminals corresponding to the pixel circuits in the plurality of columns, an input terminal of the multiplex selection circuit is electrically coupled to one data signal output terminal, a first output terminal of the multiplex selection circuit is electrically coupled to one first data line, and a second output terminal of the multiplex selection circuit is electrically coupled to one second data line; the multiplex selection circuit is configured to, when one display circle comprises one write frame and a plurality of retention frames, select the input terminal of the multiplex selection circuit to be coupled to the second output terminal;

the first control circuit is coupled to the first global signal line and coupled to one first data line, and the first control circuit is configured to, when one display cycle comprises one write frame and a plurality of retention frames, couple the first global signal line to the corresponding first data line;

the second control circuit is coupled to the second global signal line and one second data line, and the second control circuit is configured to, when one display cycle comprises one write frame and a plurality of retention frames, disconnect the second global signal line from the second data line;

the multiplex selection circuit is configured to, when one display circle comprises a plurality of write frames, select the input terminal of the multiplex selection circuit to be coupled to the first output terminal; the first control circuit is configured to, when one display cycle comprises a plurality of write frames, disconnect the first global signal line from the corresponding first data line; the second control circuit is coupled to the second global signal line and is configured to, when one display cycle comprises a plurality of write frames, couple the second global signal line to the corresponding second data line.

20. The display panel according to claim 19, wherein at least one of the following configurations is satisfied:

light-emitting modules in pixel circuits in a same column are of a same color;

first control circuits connected to first data lines connected to pixel circuits of a same color are connected to a same first global signal line, and first control circuits connected to first data lines connected to pixel circuits of different colors are connected to different first global signal lines;

the multiplex selection circuit comprises a first selection transistor and a second selection transistor, a first electrode of the first selection transistor is electrically connected to a corresponding data signal output terminal, and a second electrode of the first selection transistor is electrically connected to the first output terminal; a first electrode of the second selection transistor is electrically connected to a corresponding data signal output terminal, and a second electrode of the second selection transistor is electrically connected to the second output terminal; a gate of the first selection transistor is connected to a first selection signal line, and a gate of the second selection transistor is connected to a second selection signal line;

the first control circuit comprises a first control transistor, a first electrode of the first control transistor is connected to a corresponding first global signal line, a second electrode of the first control transistor is connected to a corresponding first data line, and a gate of the first control transistor is connected to a third selection signal line; wherein third selection signal lines connected to first control transistors connected to pixel circuits of different colors are different; and the second control circuit comprises a second control transistor, a first electrode of the second control transistor is connected to a corresponding second global signal line, a second electrode of the second control transistor is connected to a corresponding second data line, and a gate of the second control transistor is connected to a fourth selection signal line.

* * * * *